(12) United States Patent
Moon et al.

(10) Patent No.: US 9,837,068 B2
(45) Date of Patent: Dec. 5, 2017

(54) SOUND SAMPLE VERIFICATION FOR GENERATING SOUND DETECTION MODEL

(71) Applicant: QUALCOMM Incorporated, San Diego, CA (US)

(72) Inventors: Sunkuk Moon, Sungnam (KR); Minho Jin, Anyang (KR); Haiying Xia, San Diego, CA (US); Hesu Huang, San Diego, CA (US); Warren Frederick Dale, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/682,009

(22) Filed: Apr. 8, 2015

(65) Prior Publication Data

US 2016/0118039 A1    Apr. 28, 2016

Related U.S. Application Data

(60) Provisional application No. 62/067,322, filed on Oct. 22, 2014.

(51) Int. Cl.
   G10L 15/00   (2013.01)
   G10L 15/02   (2006.01)
   G10L 15/06   (2013.01)
   G10L 15/08   (2006.01)
   G10L 15/22   (2006.01)

(52) U.S. Cl.
   CPC ............ G10L 15/02 (2013.01); G10L 15/063 (2013.01); G10L 15/08 (2013.01); G10L 15/22 (2013.01); G10L 2015/022 (2013.01); G10L 2015/025 (2013.01); G10L 2015/027 (2013.01)

(58) Field of Classification Search
   None
   See application file for complete search history.

(56) References Cited

U.S. PATENT DOCUMENTS

| 4,994,983 | A | * | 2/1991 | Landell | G10L 15/063 704/245 |
| 6,134,527 | A | * | 10/2000 | Meunier | G10L 15/063 704/239 |
| 8,635,237 | B2 | * | 1/2014 | Bansal | G06F 17/30864 704/231 |
| 8,983,832 | B2 | * | 3/2015 | Allen | G10L 21/0364 704/200.1 |
| 2004/0034526 | A1 | | 2/2004 | Ma | |
| 2004/0190688 | A1 | | 9/2004 | Timmins et al. | |

(Continued)

FOREIGN PATENT DOCUMENTS

WO    0221509 A1    3/2002

OTHER PUBLICATIONS

International Search Report and Written Opinion—PCT/US2015/053665—ISA/EPO—dated Jan. 4, 2016, 11 pages.

*Primary Examiner* — Marcus T Riley
(74) *Attorney, Agent, or Firm* — Toler Law Group, P.C.

(57) ABSTRACT

A method for verifying at least one sound sample to be used in generating a sound detection model in an electronic device includes receiving a first sound sample; extracting a first acoustic feature from the first sound sample; receiving a second sound sample; extracting a second acoustic feature from the second sound sample; and determining whether the second acoustic feature is similar to the first acoustic feature.

28 Claims, 11 Drawing Sheets

(56) References Cited

U.S. PATENT DOCUMENTS

| | | | |
|---|---|---|---|
| 2006/0215821 A1 | 9/2006 | Rokusek et al. | |
| 2010/0142715 A1* | 6/2010 | Goldstein | G06F 17/30743 381/56 |
| 2011/0004474 A1* | 1/2011 | Bansal | H04H 60/45 704/246 |
| 2011/0004624 A1* | 1/2011 | Bansal | G06F 17/30864 707/776 |
| 2011/0320202 A1* | 12/2011 | Kaufman | G10L 17/04 704/251 |
| 2012/0041759 A1* | 2/2012 | Barker | H04H 60/05 704/201 |
| 2013/0225128 A1 | 8/2013 | Gomar | |
| 2014/0100851 A1* | 4/2014 | Bansal | G06F 17/30864 704/251 |
| 2014/0244257 A1 | 8/2014 | Colibro et al. | |
| 2015/0063575 A1* | 3/2015 | Tan | G06F 17/30743 381/56 |
| 2015/0117652 A1* | 4/2015 | Sato | G10L 21/0216 381/56 |
| 2016/0118039 A1* | 4/2016 | Moon | G10L 15/063 704/239 |
| 2016/0293180 A1* | 10/2016 | Ur | G10L 15/26 |

\* cited by examiner

SOUND SAMPLE VERIFICATION FOR GENERATING SOUND DETECTION MODEL

CROSS-REFERENCE TO RELATED APPLICATION(S)

This application claims the benefit of priority from U.S. Provisional Patent Application No. 62/067,322 entitled "SOUND SAMPLE VERIFICATION FOR GENERATING SOUND DETECTION MODEL," filed on Oct. 22, 2014, the entire contents of which are incorporated herein by reference.

FIELD OF THE DISCLOSURE

The present disclosure relates generally to verifying sound samples in an electronic device, and more specifically, to verifying sound samples for generating a sound detection model in an electronic device.

DESCRIPTION OF RELATED ART

In recent years, electronic devices such as smartphones, tablet computers, wearable electronic devices, and the like are becoming increasingly popular among consumers. These devices typically provide voice and/or data communication functionalities over wireless or wired networks. In addition, such electronic devices often include a speech recognition function for receiving and recognizing voice commands from a user. Such a function allows an electronic device to perform a function associated with a voice command (e.g., a keyword) when a voice command from the user is received and recognized. For example, the electronic device may activate a voice assistant application, play an audio file, or take a picture in response to a voice command from the user.

In electronic devices having a speech recognition feature, manufacturers or carriers often equip the devices with predetermined keywords and associated sound models, which may be used in detecting the keywords in an input sound. These sound models are typically generated based on a large number of sound recordings (e.g., thousands of speech samples or more) of keywords from different speakers in various sound environments. Such sound models provided by the manufacturers or carriers may be refined by a user of an electronic device. For example, an electronic device may receive several utterances of a predetermined keyword from the user and train a pre-stored sound model associated with the predetermined keyword using the utterances. Some electronic devices may also allow a user to designate a keyword as a voice command. In this case, electronic devices may receive several utterances of the designated keyword from a user and generate a sound model for the designated keyword from the utterances.

In general, the detection performance of a sound model is related to the number and quality of utterances from which the sound model is generated or trained. The detection performance of the sound model may improve as the number of utterances increases. For a given number of utterances for a keyword, however, the quality of the utterances may vary between speakers or between utterances. For example, if an utterance is received from an unintended user, the detection performance of the keyword model generated from the utterance may be degraded in detecting the keyword in an input sound from an intended user. On the other hand, if a user pronounces the keyword differently in two utterances, the keyword may not be detected correctly from the sound model generated from the utterances. Further, some utterances may be received in a noisy sound environment and thus may not provide sufficient quality for generating a sound model. Thus, the sound model generated or trained from such utterances may not produce adequate detection performance.

SUMMARY OF THE INVENTION

The present disclosure relates to verifying sound samples for generating a sound detection model in an electronic device.

According to one aspect of the present disclosure, a method for verifying at least one sound sample to be used in generating a sound detection model is disclosed. The method may be performed in an electronic device. In this method, a first sound sample may be received. A first acoustic feature may be extracted from the first sound sample. Further, a second sound sample may be received. A second acoustic feature may be extracted from the second sound sample. Whether the second acoustic feature is similar to the first acoustic feature is determined. This disclosure also describes an apparatus, a device, a system, a combination of means, and a computer-readable medium relating to this method.

According to another aspect of the present disclosure, an electronic device for verifying at least one sound sample to be used in generating a sound detection model is disclosed. The electronic device may include a sound sensor and a sound sample verification unit. The sound sensor may be configured to receive a first sound sample and a second sound sample. The sound sample verification unit may be configured to extract a first acoustic feature from the first sound sample; extract a second acoustic feature from the second sound sample; and determine whether the second acoustic feature is similar to the first acoustic feature.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
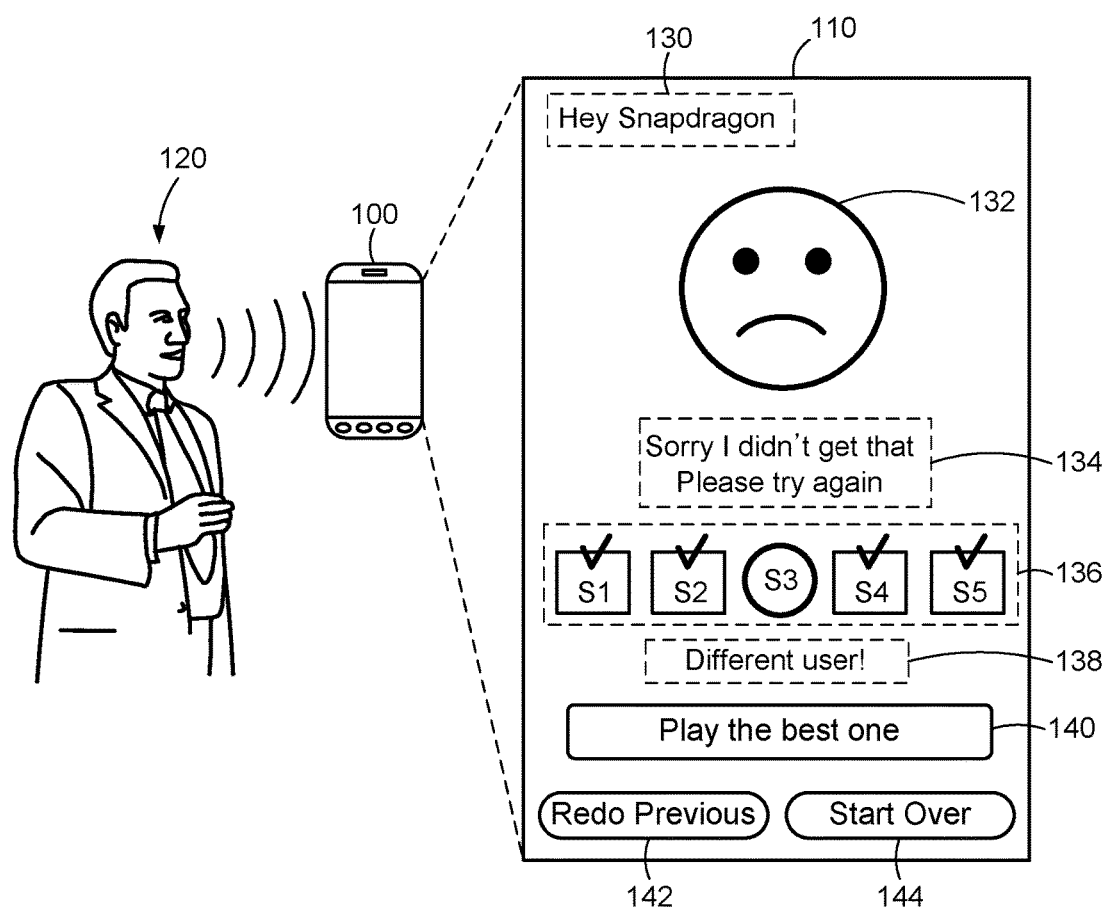
FIG. 1 illustrates an electronic device configured to verify one or more sound samples for generating a sound detection model, according to one embodiment of the present disclosure.

FIG. 1 illustrates an electronic device 100 configured to verify a plurality of sound samples S1, S2, S3, S4, and S5 for generating a sound detection model, according to one embodiment of the present disclosure. The electronic device 100 may be any suitable device equipped with a sound capturing and processing capability such as a smartphone, a cellular phone, a personal computer, a laptop computer, a tablet computer, a smart television, a gaming device, a multimedia player, or the like. The electronic device 100 may receive the sound samples S1, S2, S3, S4, and S5 from a user 120 for use in generating the sound detection model.

Although the electronic device 100 is illustrated as receiving five sound samples S1, S2, S3, S4, and S5, any suitable number of sound samples may be received and processed for generating a sound detection model and the number of sound samples may be predetermined based on a number of factors such as a user's convenience, preference, performance requirement, and the like. In one embodiment, the sound samples S1, S2, S3, S4, and S5 may be received one after another and then processed in a batch mode. In another embodiment, the sound samples S1, S2, S3, S4, and S5 may be received and processed one at a time as will be described in more detail with reference to FIG. 2 below.

As used herein, the term "sound detection model" may refer to a model or a database used in detecting a keyword and/or a specific user in sound signals or data of an input sound received by the electronic device 100 and may include one or more acoustic features or characteristics indicative of the keyword and/or user. For example, a sound detection model may be a keyword detection model associated with or indicative of a keyword and adapted to detect the keyword in an input speech received from a user. The term "keyword" may refer to any digital or analog sound representation of one or more words that can be used to activate, operate, or control a function or an application in the electronic device 100. Additionally or alternatively, the sound detection model may be a speaker verification model adapted to recognize a user from an input sound.

In one embodiment, the acoustic features may include spectral features, time domain features, or the like, which may be indicative of a keyword or a specific user. The spectral features may include mel frequency cepstral coefficients (MFCC), cepstrum difference coefficients (delta MFCC), line spectral pair (LSP) coefficients, or the like. The time domain features may include a zero crossing rate, a frame energy, or the like. The acoustic features may also include statistical measures of spectral features or time domain features such as a mean, a median, a mode, a variance, standard deviations, a covariance, a maximum value, a minimum value, a kurtosis, a high order momentum, etc., which may be indicative of a keyword or a specific user. In another embodiment, the acoustic features may include a sequence of subwords which may be indicative of a keyword or a specific user. As used herein, the term "subword" or "subword unit" may refer to a basic sound unit such as a phone, a phoneme, a triphone, a syllable, etc. Additionally or alternatively, the acoustic features may include a sound intensity level, a signal-to-noise ratio (SNR), or a reverberation time (RT), which may be indicative of sound quality.

The electronic device 100 may be configured to store one or more keywords for activating or performing one or more associated functions or applications in the electronic device 100. The keywords may be one or more predetermined keywords (e.g., keywords assigned by a manufacturer) and/or one or more user-defined keywords. A keyword detection model for a predetermined keyword may be used in detecting the predetermined keyword in an input sound received by the electronic device 100. According to one embodiment, a plurality of keyword detection models for a plurality of predetermined keywords may be generated by a third-party provider or a manufacturer of the electronic device 100 and pre-stored in the electronic device 100 and/or downloaded from an external server or device (not shown).

In the illustrated embodiment, the electronic device 100 may receive the sound samples S1, S2, S3, S4, and S5 indicative of a predetermined keyword "Hey Snapdragon" 130 from the user 120. A pre-stored keyword detection model associated with the predetermined keyword may be adapted to the user 120 by training the keyword detection model based on the sound samples S1, S2, S3, S4, and S5 from the user 120. The electronic device 100 may then use the trained keyword detection model adapted to the user 120 for detecting the predetermined keyword in an input sound.

In an additional or alternative embodiment, the user 120 may also define one or more user-defined keywords associated with one or more functions or applications to be activated or performed in the electronic device 100. For example, the electronic device 100 may receive the sound samples S1, S2, S3, S4, and S5 from the user 120 as sound samples indicative of a user-defined keyword. As used herein, the term "user-defined keyword" may refer to a keyword that may be defined or designated by the user 120 for activating or performing a function or an application of the electronic device 100. Based on the received sound samples S1, S2, S3, S4, and S5, the electronic device 100 may generate a keyword detection model for the user-defined keyword that is adapted to the user 120. The electronic device 100 may then use the generated keyword detection model adapted to the user 120 for detecting the user-defined keyword in an input sound.

Additionally or alternatively, a sound detection model may include a speaker verification model adapted to recognize the user 120 from an input sound. To generate a speaker verification model for recognizing the user 120, the electronic device 100 may request the user 120 to speak a keyword, such as a predetermined keyword or a user-defined keyword, a specified number of times, which may be predetermined. When the user 120 provides the requested number of sound samples (e.g., the sound samples S1, S2, S3, S4, and S5), the electronic device 100 may generate a speaker verification model for the user 120 based on the provided sound samples. The electronic device 100 may then use the generated speaker verification model adapted to the user 120 for recognizing an input sound as being associated with the user 120.

Once the sound samples S1, S2, S3, S4, and S5 for generating a sound detection model are received, the electronic device 100 may determine whether each of the received sound samples S1, S2, S3, S4, and S5 may be used in generating the sound detection model. In this process, one or more acoustic features may be extracted from each of the sound samples S1, S2, S3, S4, and S5. In one embodiment, the electronic device 100 may determine whether the acoustic features of each pair of the sound samples S1, S2, S3, S4, and S5 are similar by comparing the associated extracted acoustic features. If the acoustic features of at least two sound samples are determined to be similar to each other, the electronic device 100 may determine that the at least two sound samples are similar and may be used in generating the sound detection model. On the other hand, if an acoustic feature of a sound sample is determined not to be similar to acoustic features of at least two other sound samples, the sound sample may not be used in generating the sound detection model.

In some embodiments, a pair of sound samples may be selected from the sound samples S1, S2, S3, S4, and S5 and an acoustic feature may be extracted from each of the selected sound samples. The electronic device 100 may then determine whether the acoustic features of the selected sound samples are similar to each other. For example, the electronic device 100 may select the sound samples S1 and S2 and determine whether the acoustic features of the sound samples S1 and S2 are similar to each other. If the acoustic features of the sound samples S1 and S2 are determined to be similar, the electronic device 100 may determine that the sound samples S1 and S2 are similar and may be used in generating the sound detection model.

In one embodiment, the electronic device 100 may determine whether each of the remaining sound samples S3, S4, and S5 may be used in generating the sound detection model based on acoustic features of the sound samples S1 and S2. For example, the acoustic features of the sound samples S1 and S2 may be combined to generate a combined acoustic feature for the sound samples S1 and S2. The electronic device 100 may select the sound sample S3 and extract an acoustic feature from the sound sample S3. The combined acoustic feature of the sound samples S1 and S2 may then be compared with the acoustic feature extracted from the sound sample S3. If the combined acoustic feature and the acoustic feature of the sound sample S3 are determined to be similar, the electronic device 100 may determine that the sound sample S3 may be used in generating the sound detection model. The electronic device 100 may determine whether the sound samples S4 and S5 may be used in generating the sound detection model based on the combined acoustic features of two or more sound samples. For example, the sound sample S4 may be processed based on the combined acoustic feature of the sound samples S1 and S2 or a combined acoustic feature of the sound samples S1, S2, and S3.

As used herein, the term "similar acoustic features" or equivalent variations thereof may mean that the acoustic features are the same or substantially the same within a specified tolerance or threshold value or percentage in feature values or parameters such as spectral features, time domain features, statistical measures, subwords, or the like. For example, in the case of two sequences of subwords in acoustic features, the electronic device 100 may determine that the two sequences are similar if a percentage of identical subwords in the sequences exceeds a threshold value. In one embodiment, two acoustic features may be determined to be similar when they vary by less than 30%.

In one embodiment, the electronic device 100 may determine a sound intensity level (e.g., an average sound intensity value) of each of the sound samples S1, S2, S3, S4, and S5 as an acoustic feature. If the sound intensity level of a sound sample is determined to be less than a threshold sound level, it may indicate that the sound sample is not a good sound sample. Accordingly, the electronic device 100 may determine that the sound sample may not be used in generating a sound detection model.

Additionally or alternatively, the electronic device 100 may determine an SNR of each of the sound samples S1, S2, S3, S4, and S5 as an acoustic feature. If an SNR of a sound sample is determined to be less than a threshold SNR, it may indicate that the sound sample has too much noise. Thus, the electronic device 100 may determine that the sound sample may not be used in generating a sound detection model.

Upon determining whether the sound samples S1, S2, S3, S4, and S5 may be used in generating a sound detection model, the electronic device 100 may output an indication of whether the sound samples S1, S2, S3, S4, and S5 may be used for generating a sound detection model. In the illustrated embodiment, for the predetermined keyword "Hey Snapdragon" 130, the electronic device 100 may receive the five sound samples S1, S2, S3, S4, and S5 for the keyword from the user 120. For each of the sound samples S1, S2, S3, S4, and S5, the electronic device 100 may determine whether the sound sample may be used in generating a sound detection model. For example, the electronic device 100 may determine that the sound samples S1, S2, S4, and S5 may be used in generating a sound detection model as shown in FIG. 1.

On the other hand, the electronic device 100 may determine that the sound sample S3 may not be used in generating a sound detection model. For example, upon determining that a plurality of spectral features of the sound sample S3 are not similar to the corresponding spectral features of each of the sound samples S1, S2, S4, and S5, the electronic device 100 may determine that the users associated with the sound sample S3 and the sound samples S1, S2, S4, and S5 are different and thus may determine that the sound sample S3 may not be used in generating a sound detection model.

In one embodiment, the electronic device 100 may display a list 136 of the sound samples S1, S2, S3, S4, and S5 indicating whether each of the sound samples S1, S2, S3, S4, and S5 may be used in generating a sound detection model on a display screen 110. For example, the list 136 may indicate that the sound samples S1, S2, S4, and S5 are good sound samples that may be used for generating a sound detection model by displaying each of the samples S1, S2, S4, and S5 in a box with a check mark. On the other hand, the sound sample S3, which may not be a good sound sample, may be displayed in the list 136 in a circle. Further, a message 138 indicating that the sound sample S3 is associated with a different user may be displayed on the display screen 110. Additionally or alternatively, a frowning face 132 indicating that the sound sample S3 is not a good sound sample and thus may not be used in generating a sound detection model may be displayed on the display screen 110 along with a message 134 requesting the user 120 to input an additional sound sample for the sound sample S3.

In some embodiments, the message 138 may include a brief description of one or more reasons that a sound sample may not be used in generating a sound detection model. For example, the message 138 may include one or more reasons indicating that speaker characteristics of the sound sample are different from speaker characteristics of the other sound samples, a recognized keyword of the sound sample is different from recognized keywords of other sound samples, a sound intensity level of the sound sample is lower than a threshold sound intensity level, an SNR of the sound sample is lower than a threshold SNR, or the like.

The electronic device 100 may also be configured to determine a highest quality sound sample among the sound samples S1, S2, S3, S4, and S5 based on the associated acoustic features. The highest quality sound sample may be used to generate a sequence of subwords for a sound detection model. In this embodiment, an icon 140 (e.g., a clickable bar) may be associated with a command to play a highest quality sound sample as a best sound sample and displayed on the display screen 110. When the user 120 presses the icon 140, the electronic device 100 may play the best sound sample, which may be referenced by the user 120 for inputting one or more additional sound samples. Additionally or alternatively, the electronic device 100 may receive an input from the user 120 identifying one of the sound samples S1, S2, S3, S4, and S5 as a best sound sample and generate a sequence of subwords for a sound detection model based on the identified sound sample. Although the electronic device 100 is configured to display the icon 140 for playing a best sound sample, it may also be configured to allow the user 120 to select any sound sample among the sound samples S1 to S5 in the list 136 and play the selected sound sample.

In one embodiment, the electronic device 100 may display a plurality of icons 142 and 144 for inputting one or more substitute or additional sound samples. The icon "Redo Previous" 142 may indicate reentering the previously received sound sample for the user 120. When the user 120 presses the icon 142, the electronic device 100 may discard the previously received sound sample and receive a new sound sample from the user 120 as a replacement sample for the discarded sound sample. On the other hand, the icon "Start Over" 144 may indicate entering new sound samples for the sound samples S1 to S5, which may be discarded. For example, if none of the sound samples S1 to S5 are determined to be used in generating a sound detection model or if the user 120 wants to enter new sound samples for the sound samples S1 to S5, the user 120 may input the new sound samples by pressing the icon 144. Upon receiving the new sound samples, the electronic device 100 may determine whether the new sound samples may be used in generating a sound detection model and display the results for the new sound samples on the display screen 110.

According to some embodiments, the electronic device 100 may also be configured to receive an input from the user 120 selecting one or more sound samples S1, S2, S3, S4, and S5 that may be used in generating a sound detection model. For example, the user 120 may select the sound samples S1, S2, and S4 for use in generating a sound detection model. Additionally or alternatively, the electronic device 100 may receive an input from the user 120 selecting one or more sound samples to be replaced by new sound samples. For example, the user 120 may select the sound sample S4, which may have been determined to be used in generating a sound detection model by the electronic device 100, to be replaced with a new sound sample. In this manner, the electronic device 100 may receive and process one or more new sound samples for the sound samples S1, S2, S3, S4, and S5 based a selection by the user 120.

When the sound samples S1, S2, S3, S4, and S5 are determined to be used in generating a sound detection model, the electronic device 100 may generate a sound detection model based on at least one of the sound sample S1, S2, S3, S4, or S5. For example, the electronic device 100 may generate a sound detection model based on the acoustic features of the sound samples S1, S2, S3, S4, and S5. In this case, the acoustic features may be the same acoustic features as the acoustic features that have been used for determining whether the sound samples may be used in generating a sound detection model. Additionally or alternatively, the electronic device 100 may extract acoustic features from the sound samples that are adapted to or suitable for generating a sound detection model.

In one embodiment, the electronic device 100 may use at least one sound sample, which may have been rejected or discarded, or replaced with a new sound sample due to a low SNR, as a noise-embedded sound sample in adjusting or modifying the generated sound detection model. For example, in addition to or in lieu of using artificially generated noise samples, the sound sample that may have been rejected or discarded may be used as a noise-embedded sound sample in adjusting the generated sound detection model. Using one or more such sound samples may improve the detection performance of the sound detection model in various sound environments including a substantially noise-free environment and a noisy environment.

Additionally or alternatively, the electronic device 100 may use at least one sound sample, which may have been discarded due to a low SNR, a low sound intensity level, etc., to adjust a threshold value (e.g., a detection or similarity threshold value) for the sound detection model. For example, when an input sound indicative of a keyword is received, a plurality of sound detection models stored in the electronic device 100 may be accessed to identify a sound detection model associated with the keyword based on the threshold value. For identifying the sound detection model, a degree of similarity between the input sound and each of the keywords in the plurality of sound detection models may be determined. The electronic device 100 may then identify a sound detection model, which has a greatest similarity and whose degree of similarity is greater than or equal to the threshold value, as the sound detection model for the keyword. In one embodiment, the threshold value for the sound detection model may be determined based on at least one of the sound samples that have been determined to be used in generating the sound detection model. To enhance detection accuracy for the sound detection model, the threshold value for the sound detection model may be adjusted based on at least one sound sample, which may have been discarded due to a low SNR, a low sound intensity level, etc. For instance, the electronic device 100 may adjust the threshold value for the sound detection model using one or more sound samples that may have speaker characteristics different from speaker characteristics of the sound samples S1, S2, S3, S4, and S5, an SNR below a predetermined threshold SNR, etc.

Figure 2:
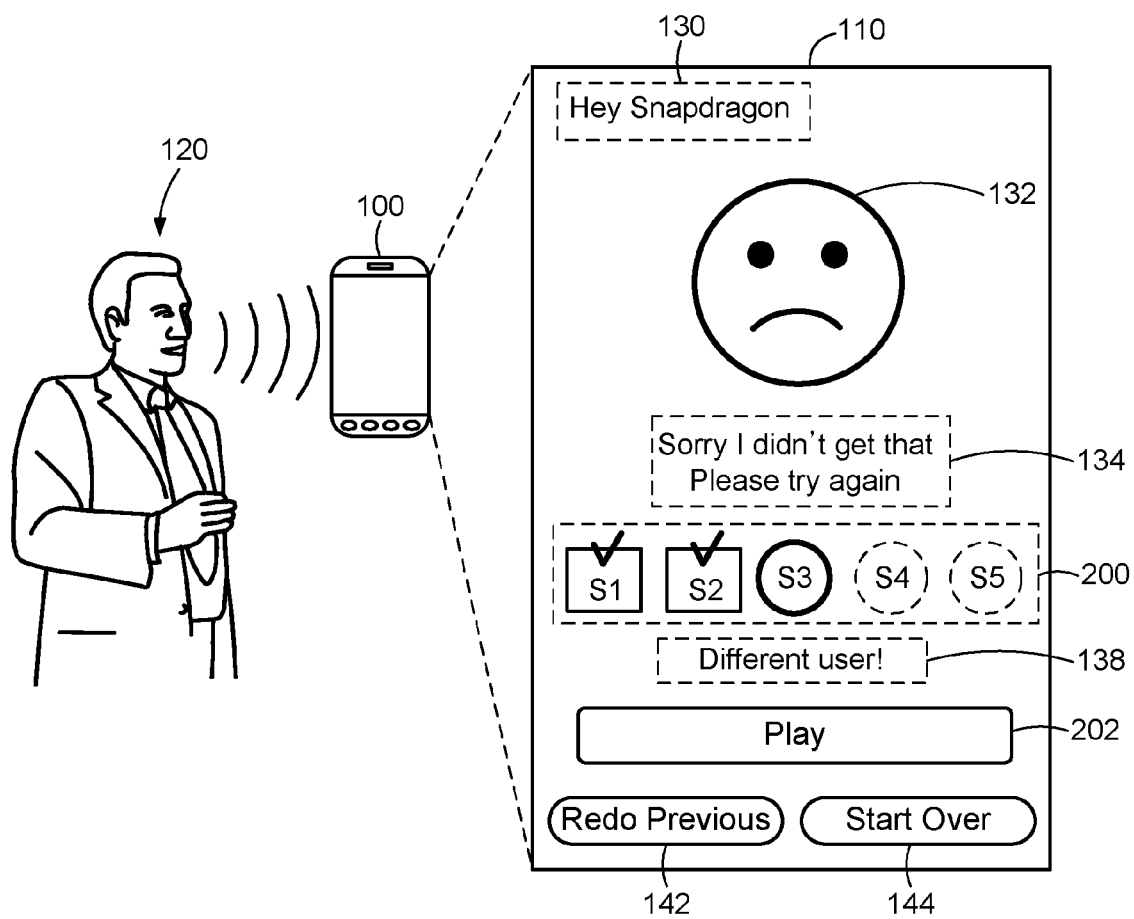
FIG. 2 illustrates an electronic device configured to verify one or more sound samples for generating a sound detection model, according to another embodiment of the present disclosure.

FIG. 2 illustrates the electronic device 100 that may be configured to verify one or more sound samples S1, S2, S3, S4, and S5 for generating a sound detection model, according to another embodiment of the present disclosure. In this embodiment, the sound samples S1, S2, S3, S4, and S5 may be received and processed sequentially one at a time. In one embodiment, the electronic device 100 may extract an acoustic feature from each sound sample when the sound sample is received and verify whether the sound quality of the sound sample is greater than or equal to a threshold quality for use in generating a sound detection model based on the acoustic feature indicative of a sound quality. If it is determined that the sound quality of the sound sample is less than the threshold quality, the electronic device 100 may receive a new sound sample from the user 120 as a replacement sound sample until it is determined that the sound quality of the sound sample is greater than or equal to the threshold quality. The electronic device 100 may then proceed to determine whether the sound sample may be used in generating the sound detection model based on whether the acoustic features of the sound sample and one or more other sound samples are similar.

The electronic device 100 may initially receive the sound sample S1 from the user 120 and extract an acoustic feature from the sound sample S1. The electronic device 100 may determine whether the sound quality of the sound sample S1 is greater than or equal to a threshold quality for use in generating a sound detection model based on the acoustic feature indicative of a sound quality such as an SNR, a sound intensity level, or the like. If the electronic device 100 determines that the sound quality of the sound sample S1 is less than a threshold quality, it may display the message 134 prompting the user 120 to reenter the sound sample S1 until it is determined that the sound quality of the sound sample S1 is greater than or equal to a threshold quality for use in generating a sound detection model.

When the electronic device 100 determines that the sound quality of the sound sample S1 is greater than or equal to a threshold quality for use in generating a sound detection model, it may receive the next sound sample S2 from the user 120 and extract an acoustic feature from the sound sample S2. The electronic device 100 may determine whether the acoustic features of the sound samples S1 and S2 are similar for use in generating a sound detection model and output the results on the display screen 110. If the acoustic features of the sound samples S1 and S2 are determined to be similar, the electronic device 100 may generate a combined acoustic feature based on the acoustic features of the sound samples S1 and S2. If the acoustic features of the sound samples S1 and S2 are determined not to be similar, the electronic device 100 may request the user 120 to input a new sound sample as a replacement sound sample for the sound sample S1 and/or S2 until it is determined that the acoustic features of the sound samples S1 and S2 are similar.

Upon determining that the acoustic features of the sound samples S1 and S2 are similar, the electronic device 100 may receive the next sound sample S3 from the user 120 and extract an acoustic feature from the sound sample S3. The electronic device 100 may then determine whether the acoustic feature of the sound sample S3 is similar to the combined acoustic feature of the sound samples S1 and S2. Additionally or alternatively, the electronic device 100 may determine whether the acoustic features of each pair of the sound samples S1, S2, and S3 are similar. For example, the electronic device 100 may determine whether the acoustic features of the sound samples S1 and S3 are similar and/or determine whether the acoustic features of the sound samples S2 and S3 are similar. The results for the sound samples S1, S2, and S3 may be displayed on the display screen 110 as shown in FIG. 2. In this manner, the electronic device 100 may also proceed to sequentially receive the sound samples S4 and S5 and determine whether each of the sound samples S4 and S5 may be used in generating a sound detection model based on acoustic features or a combination of acoustic features associated with the previously received sound samples.

As shown in the illustrated embodiment, the electronic device 100 may display a list 200 of the sound samples S1, S2, and S3 indicating whether each of the sound samples S1, S2, and S3 may be used in generating a sound detection model on the display screen 110. For example, the list 200 may indicate that the sound samples S1 and S2 are good sound samples that may be used in generating a sound detection model by displaying each of the samples S1 and S2 in a box with a check mark. On the other hand, the sound sample S3, which may not be a good sound sample, may be displayed in the list 200 in a circle. Further, the message 138 indicating that the sound sample S3 is associated with a different user may also be displayed on the display screen 110. Additionally or alternatively, the frowning face 132 indicating that the sound sample S3 is not a good sound sample and thus may not be used in generating a sound detection model may be displayed on the display screen 110 along with the message 134 prompting the user 120 to input another sound sample for the sound sample S3. Further, an icon 202 on the display screen 110 may be associated with a command to play a sound sample that may be selected from the sound samples S1, S2, and S3. When the user 120 presses the icon 202 when the sound sample S3 is selected, the electronic device 100 may play the sound sample S3.

The electronic device 100 may also display a plurality of icons 142 and 144 for inputting one or more substitute or additional sound samples. The icon "Redo Previous" 142 may indicate reentering the previously received sound sample (e.g., the sound sample S3). When the user 120 presses the icon 142, the electronic device 100 may receive a new sound sample as a replacement sample for the discarded sound sample. On the other hand, the icon "Start Over" 144 may indicate entering new sound samples for the sound samples S1, S2, and S3 that have been received. For example, if it is determined that none of the sound samples S1, S2, and S3 are to be used in generating a sound detection model or if the user 120 wants to enter new sound samples for the sound samples S1, S2, and S3, the user 120 may input the new sound samples by pressing the icon 144. Upon sequentially receiving each of the new sound samples S1, S2, S3, S4, and S5, the electronic device may determine whether each new sound sample may be used in generating a sound detection model and display the determination results for the new sound sample on the display screen 110.

In the illustrated embodiment, the sound samples S4 and S5 may be illustrated by a dotted circle to indicate that they have not been received yet. Although the electronic device 100 is described with reference to the sound sample S3, it may also process each of the sound samples S1, S2, S4, and S5 for generating a sound detection model in a manner described above with reference to FIG. 1 and cumulatively display information for the sound sample and previously received sound samples.

The electronic device 100 may receive subsequent sound samples S4 and S5 and determine that each of the sound samples S1, S2, S3, S4, and S5 may be used in generating a sound detection model. The results for the sound samples S1 to S5 may be displayed cumulatively on the display screen 110. When it is determined that the sound samples S1, S2, S3, S4, and S5 may be used in generating a sound detection model, the electronic device 100 may generate a sound detection model based on at least one of the sound sample S1, S2, S3, S4, or S5. For example, the electronic device 100 may generate a sound detection model based on the acoustic features of the sound samples S1, S2, S3, S4, and S5. In this case, the acoustic features may be the same acoustic features as the acoustic features that have been used for determining whether the sound samples may be used in generating a sound detection model. Additionally or alternatively, the electronic device 100 may extract acoustic features from the sound samples that are adapted to or suitable for generating a sound detection model. According to some embodiments, the electronic device 100 may also be configured to receive an input from the user 120 indicating whether each of the sound samples may be used in generating a sound detection model. In this case, one or more sound samples selected by the user 120 may be used in generating a sound detection model even if the electronic device 100 has determined that the sound samples may not be used in generating a sound detection model.

Figure 3:
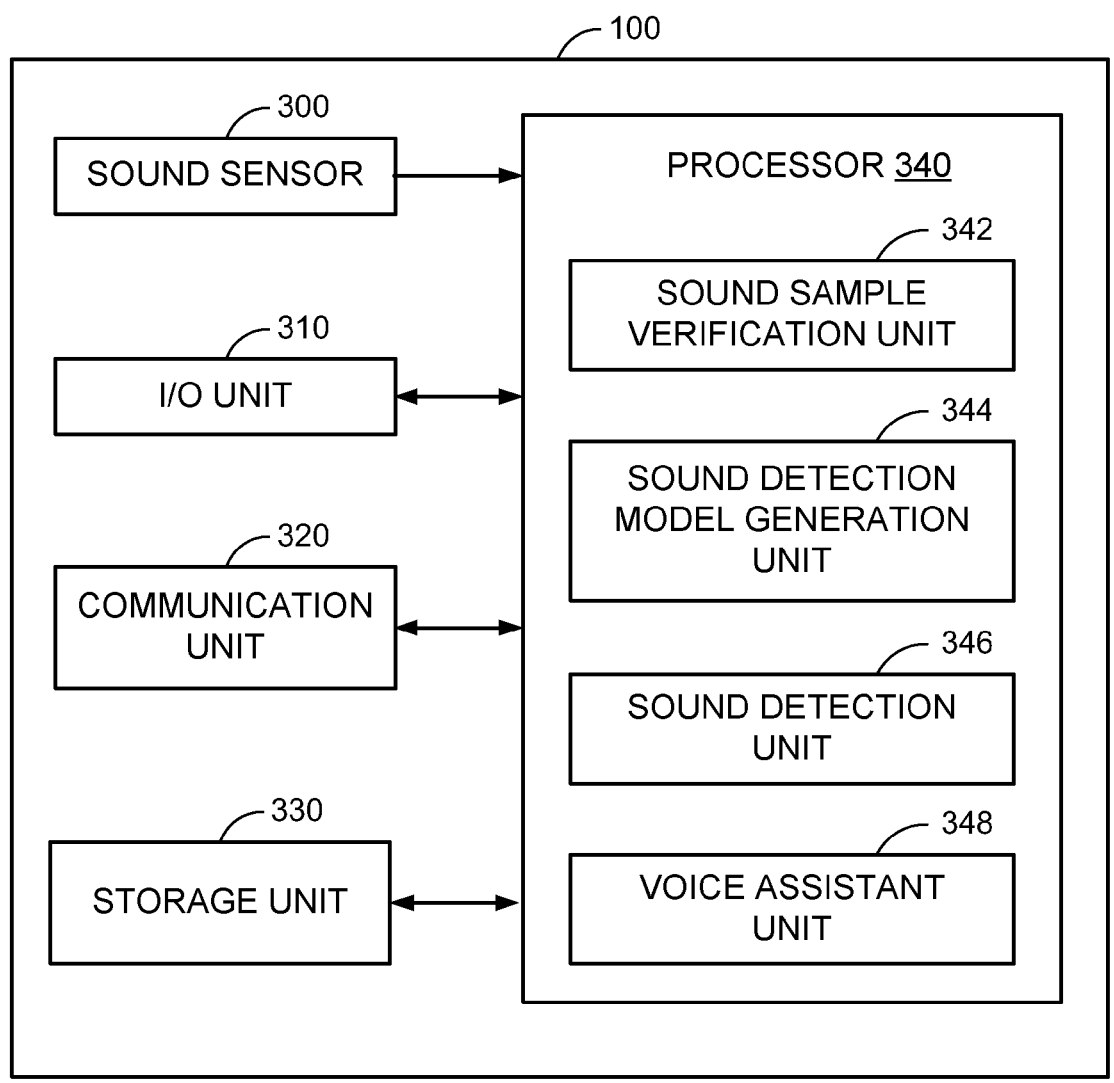
FIG. 3 illustrates a block diagram of an electronic device configured to verify one or more sound samples for generating a sound detection model, according to one embodiment of the present disclosure.

FIG. 3 illustrates a block diagram of the electronic device 100 configured to verify one or more sound samples for generating a sound detection model, according to one embodiment of the present disclosure. The electronic device 100 may include a sound sensor 300, an input/output (I/O) unit 310, a communication unit 320, and a storage unit 330, and a processor 340. The I/O unit 310 may include the display screen 110 and a speaker (not shown). The display screen 110 may be a touch display screen configured to receive a touch input from a user. The processor 340 may include a sound sample verification unit 342, a sound detection model generation unit 344, a sound detection unit 346, and a voice assistant unit 348. The processor 340 may be implemented using any suitable processing unit such as a central processing unit (CPU), an application processor, a microprocessor, or the like that can execute instructions or perform operations for the electronic device 100.

The sound sensor 300 may be configured to receive an input sound stream from a user. As used herein, the term "sound stream" may refer to a sequence of one or more sound signals or sound data. The sound sensor 300 may include one or more microphones or any other types of sound sensors that can be used to receive, capture, sense, and/or detect a sound input to the electronic device 100. In addition, the sound sensor 300 may employ any suitable software and/or hardware for performing such functions. The received input sound stream of a user may be stored in the storage unit 330. The sound sensor 300 may provide the received input sound stream of a user to the processor 340 for processing.

In one embodiment, the sound sensor 300 may receive an input sound stream including one or more sound samples from a user. Upon receiving the input sound stream, the sound sensor 300 may detect each of the sound samples from the input sound stream by detecting a start and end points of each of the sound samples or isolated utterances in the input sound stream using any suitable endpoint detection algorithms. The detected sound samples may be extracted and stored in the storage unit 330. The extracted sound samples may be provided to the processor 340 for processing.

The storage unit 330 may be configured to store data and instructions for operating the sound sensor 300, the I/O unit 310, the communication unit 320, and the processor 340. The storage unit 330 may also store an input sound stream received by the sound sensor 300 or one or more sound samples extracted from the input sound stream. The storage unit 330 may be implemented using any suitable storage or memory devices such as a random access memory (RAM), a read-only memory (ROM), an electrically erasable programmable read-only memory (EEPROM), a flash memory, or a solid state drive (SSD).

The storage unit 330 may also store at least one subword model that may be pre-stored in the storage unit 330 and/or downloaded from an external server or device (not shown) via the communication unit 320. In some embodiments, the subword model may be, but not limited to, a phone-based model, a phoneme-based model, a triphone-based model, a syllable-based model, or the like, according to the type of subwords represented by the subword model, and may include a list of subword units and one or more acoustic features for each subword unit.

The storage unit 330 may also store one or more sound detection models used in detecting a keyword and/or a specific user in sound signals or data in an input sound. For example, the sound detection models may include a speaker verification model adapted to recognize a user from an input sound. Additionally or alternatively, the sound detection models may include one or more keyword detection models for detecting predetermined keywords and/or one or more keyword detection models for detecting user-defined keywords. The keyword detection models for detecting predetermined keywords may be pre-stored in the storage unit 330 or downloaded from an external server or device (not shown) via the communication unit 320. In one embodiment, a keyword detection model may include a sequence of subwords including a plurality of portions (i.e., a plurality of subwords or subword units), which can be determined from one or more sound samples indicative of a keyword. The keyword detection model may also include model parameters associated with each of a plurality of subwords in the sequence of subwords, and a threshold value for detecting a keyword.

In another embodiment, the keyword detection model may include a subword network. The subword network may include a plurality of nodes and a plurality of lines that can connect at least two nodes of the plurality of nodes. The keyword detection model may also include at least one graphical model such as a hidden Markov model (HMM), a semi-Markov model (SMM), or the like, which corresponds to a node of the subword network. The graphical model may include a number of states and parameters such as a transition probability, a state output probability, etc.

The sound sample verification unit 342 in the processor 340 may be configured to receive one or more sound samples from the sound sensor 300 or the storage unit 330 and determine whether each of the received sound samples may be used in generating a sound detection model. Additionally or alternatively, the sound sample verification unit 342 may receive an input sound stream including one or more sound samples from the sound sensor 300 or the storage unit 330 and extract each of the sound samples from the input sound stream using any suitable endpoint detection algorithms. In this case, the sound sample verification unit 342 may store the extracted sound samples in the storage unit 330.

Once the sound samples are received or extracted, the sound sample verification unit 342 may extract one or more acoustic features from each of the sound samples to determine whether each of the sound samples may be used in generating a sound detection model. In one embodiment, the sound sample verification unit 342 may determine whether the acoustic features of the sound samples are similar for use in generating a sound detection model. In another embodiment, the sound sample verification unit 342 may determine whether the sound quality of each of the sound samples is greater than or equal to a threshold quality for use in generating a sound detection model based on the acoustic feature indicative of a sound quality (e.g., an SNR, a sound intensity level, etc.). In some embodiments, the sound sample verification unit 342 may be configured to determine a highest quality sound sample among the sound samples based on the associated acoustic features. The determined highest quality sound sample may be provided to the sound detection model generation unit 344 for generating a sequence of subwords for a sound detection model.

Additionally or alternatively, the sound sample verification unit 342 may receive an input from a user identifying one of the sound samples as a best sound sample via the I/O unit 310. In this case, the identified sound sample may be provided to the sound detection model generation unit 344 for generating a sequence of subwords for a sound detection model. In some embodiments, the sound sample verification unit 342 may instruct the I/O unit 310 to play the best sound sample through a speaker of the I/O unit 310. Additionally or alternatively, the sound sample verification unit 342 may receive an input from a user identifying one or more sound samples to be played via the I/O unit 310 and instruct the I/O unit 310 to play the identified sound samples through a speaker of the I/O unit 310.

In some embodiments, the sound sample verification unit 342 may receive one or more substitute or additional sound samples from the sound sensor 300 or the storage unit 330. For example, if the sound sample verification unit 342 determines that one or more previously received sound samples may not be used in generating a sound detection model, it may discard the one or more previously received sound samples and receive one or more new sound samples for the discarded sound samples via the sound sensor 300. Additionally or alternatively, if none of the previously received sound samples are determined to be used in generating a sound detection model, the sound sample verification unit 342 may discard the previously received sound samples and receive one or more new sound samples via the sound sensor 300.

According to one embodiment, the sound sample verification unit 342 may receive the sound samples one after another and then process the received sound samples in a batch mode. For example, when five sound samples are received, the sound sample verification unit 342 may determine whether all five sound samples may be used in generating a sound detection model and instruct the I/O unit 310 to output an indication on the determination results of all five sound samples. In another embodiment, the sound sample verification unit 342 may receive and process the sound samples one at a time.

The sound detection model generation unit 344 may be configured to receive one or more sound samples that have been determined to be used in generating a sound detection model from the sound sample verification unit 342. The sound detection model generation unit 344 may then generate a sound detection model based on at least one of the received sound samples. The sound detection model may include a speaker verification model, a keyword detection model for a predetermined keyword or a user-defined keyword, or the like. The sound detection model generation unit 344 may determine a threshold value for the sound detection model based on at least one of the received sound samples that have been determined to be used in generating the sound detection model. In one embodiment, the sound detection model generation unit 344 may receive at least one sound sample, which may have been discarded or replaced with a new sound sample due to a low SNR, from the sound sample verification unit 342 to use the sound sample as a noise-embedded sound sample in adjusting the generated sound detection model. Additionally or alternatively, the sound detection model generation unit 344 may receive at least one sound sample, which may have been discarded due to a low SNR, a low sound intensity level, etc., from the sound sample verification unit 342 and use the sound sample in adjusting the threshold value for the sound detection model. The sound detection model generation unit 344 may store the generated sound detection model in the storage unit 330.

The sound detection unit 346 may be configured to receive the input sound stream from the sound sensor 300 or the storage unit 330 and detect a keyword and/or a specific user in sound signals or data of the input sound stream based on at least one sound detection model stored in the storage unit 330. For example, upon receiving the input sound stream indicative of a keyword, the sound detection unit 346 may sequentially extract a plurality of acoustic features from the input sound stream and determine a matching score for at least one keyword (including at least one user-defined keyword and at least one predetermined keyword) associated with at least one keyword detection model. The sound detection unit 346 may then identify a keyword detection model that has a greatest matching score and whose matching score is greater than or equal to the threshold value as the matched keyword detection model for the input sound stream.

Upon identifying the matched keyword detection model associated with the keyword, the sound detection unit 346 may perform a function associated with the keyword or activate, control, or operate an application associated with the keyword. Additionally or alternatively, the sound detection unit 346 may generate and transmit an activation signal to turn on the voice assistant unit 348, which may be associated with the keyword. The voice assistant unit 348 may be activated in response to the activation signal from the sound detection unit 346. Once activated, the voice assistant unit 348 may perform a voice assistant function by outputting a message such as "MAY I HELP YOU?" on the display screen 110 and/or through a speaker of the I/O unit 310. In response, a user may speak voice commands to activate various associated functions of the electronic device 100. For example, when a voice command for Internet search is received, the voice assistant unit 348 may recognize the voice command as a search command and perform a web search via the communication unit 320.

Figure 4:
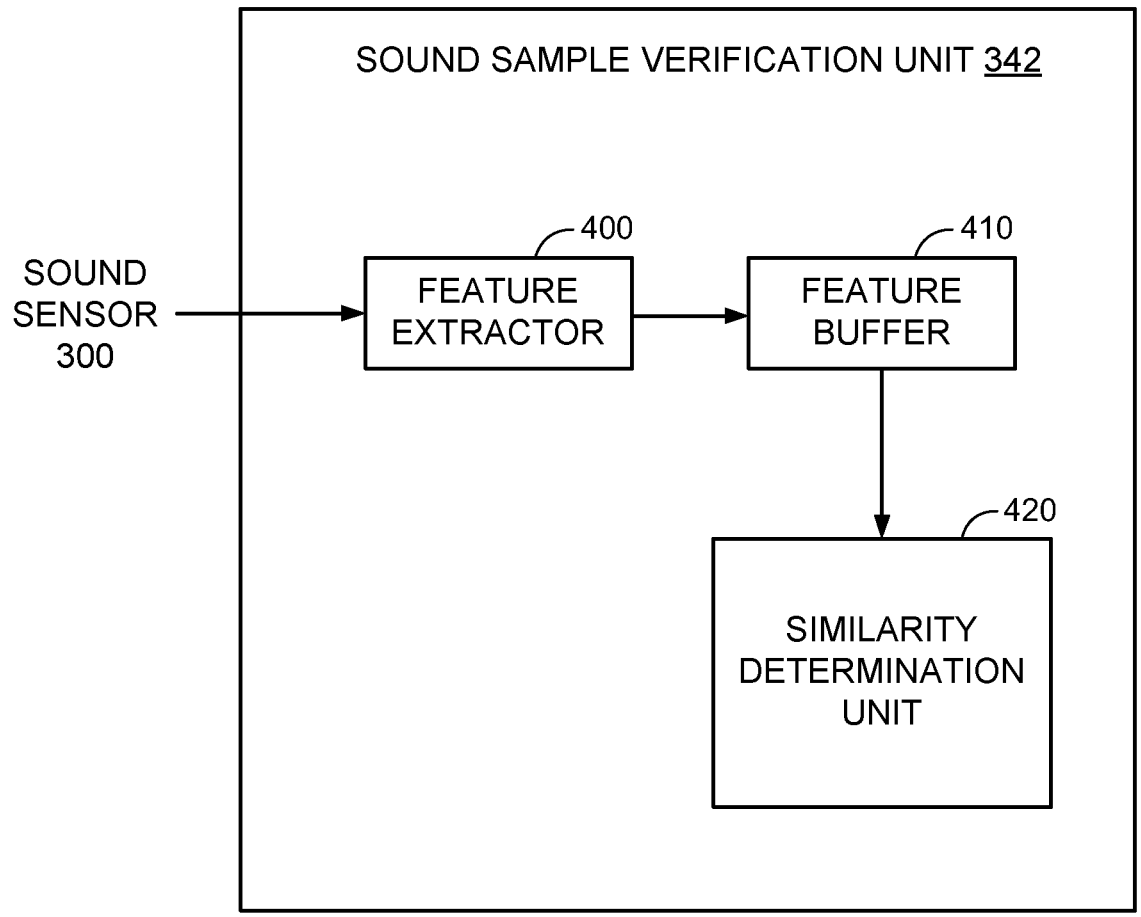
FIG. 4 illustrates a block diagram of a sound sample verification unit in an electronic device configured to determine whether one or more sound samples may be used in generating a sound detection model, according to one embodiment of the present disclosure.

FIG. 4 illustrates a block diagram of the sound sample verification unit 342 configured to determine whether one or more sound samples may be used in generating a sound detection model, according to one embodiment of the present disclosure. The sound sample verification unit 342 may include a feature extractor 400, a feature buffer 410, and a similarity determination unit 420. The feature extractor 400 may be configured to receive one or more sound samples from the sound sensor 300 or the storage unit 330 and extract one or more acoustic features from each of the received sound samples. For example, the feature extractor 400 may extract spectral features, time domain features, or the like from each of the received sound samples. In one embodiment, the feature extractor 400 may perform subword recognition on each of the received sound samples to generate a sequence of subwords for each sound sample as an acoustic feature. In another embodiment, the feature extractor 400 may extract a sound intensity level (e.g., an average sound intensive level) or an SNR from each of the received sound samples.

In some embodiments, the feature extractor 400 may calculate an RT of each of the received sound samples. In this process, the feature extractor 400 may divide each of the sound samples into a plurality of sequential frames of an equal time period and extract one or more acoustic features (e.g., spectral features) from the frames. Based on the acoustic features in the frames, a similarity in one or more acoustic features among the plurality of frames may be determined as a correlation value. Based on the correlation values, the feature extractor 400 may determine a longest time period between two frames in a sound sample having a correlation value greater than or equal to a threshold correlation value as an RT of the sound sample.

Upon extracting the one or more acoustic features from each of the sound samples, the feature extractor 400 may store the extracted acoustic features in the feature buffer 410. The feature buffer 410 may be configured to receive the extracted acoustic features from the feature extractor 400 and transmit them to the similarity determination unit 420. The extracted acoustic features may also be stored in the storage unit 330.

The similarity determination unit 420 may receive the extracted acoustic features from the feature buffer 410 or the storage unit 330 and determine whether the extracted acoustic features of the sound samples are similar. In one embodiment, the similarity determination unit 420 may determine whether the acoustic features of each pair of the sound samples are similar by comparing the associated acoustic features. If the acoustic features of at least two sound samples are determined to be similar, the similarity determination unit 420 may determine that the at least two sound samples are similar and may be used in generating the sound detection model. On the other hand, if the similarity determination unit 420 determines that an acoustic feature of a sound sample is not similar to acoustic features of at least two other sound samples, it may determine that the sound sample may not be used in generating the sound detection model.

In another embodiment, the similarity determination unit 420 may determine a combined acoustic feature of two or more sound samples and determine whether an acoustic feature of a sound sample is similar to the combined acoustic feature. The combined acoustic feature may be stored in the feature buffer 410 or the storage unit 330. For example, if the acoustic features of the first and second sound samples are determined to be similar, the similarity determination unit 420 may determine a combined acoustic feature based on the acoustic features of the first and second sound samples. In this case, if an acoustic feature of the third sound sample is determined to be similar to the combined acoustic feature, the similarity determination unit 420 may determine that the first, second, and third sound samples are similar and may be used in generating the sound detection model. On the other hand, if the similarity determination unit 420 determines that an acoustic feature of the third sound sample is not similar to the combined acoustic feature, it may determine that the third sound sample may not be used in generating the sound detection model.

Figure 5:
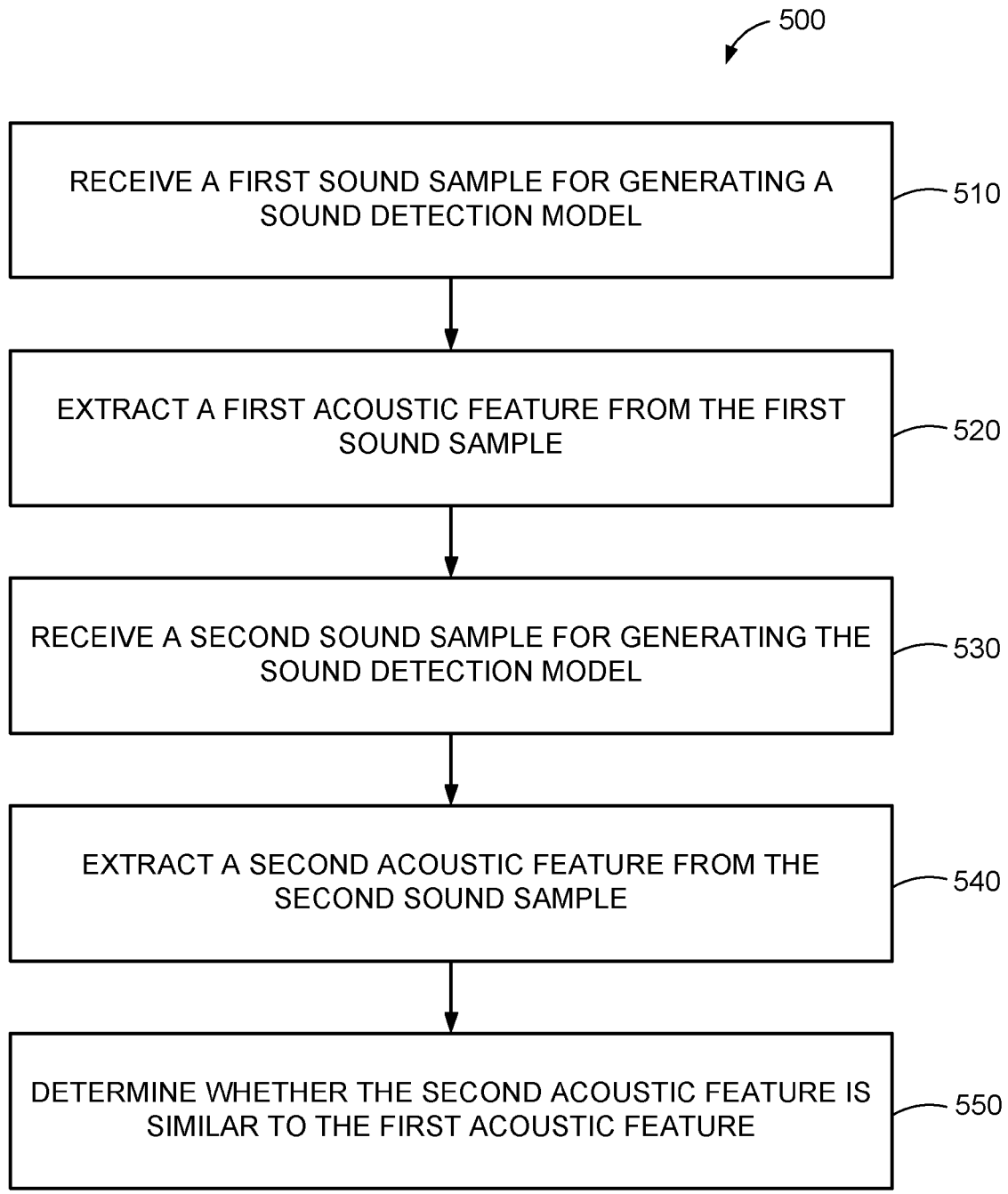
FIG. 5 is a flow chart of an exemplary method, performed in an electronic device, for verifying one or more sound samples to be used in generating a sound detection model, according to one embodiment of the present disclosure.

FIG. 5 is a flow chart of a method 500, performed in the electronic device 100, for verifying one or more sound samples to be used in generating a sound detection model, according to one embodiment of the present disclosure. Initially, the electronic device 100 may receive a first sound sample for generating a sound detection model, at 510. The electronic device 100 may extract a first acoustic feature from the first sound sample, at 520. The electronic device 100 may receive a second sound sample for generating the sound detection model, at 530. The electronic device 100 may extract a second acoustic feature from the second sound sample, at 540. The electronic device 100 may determine whether the second acoustic feature is similar to the first acoustic feature, at 550.

Figure 6:
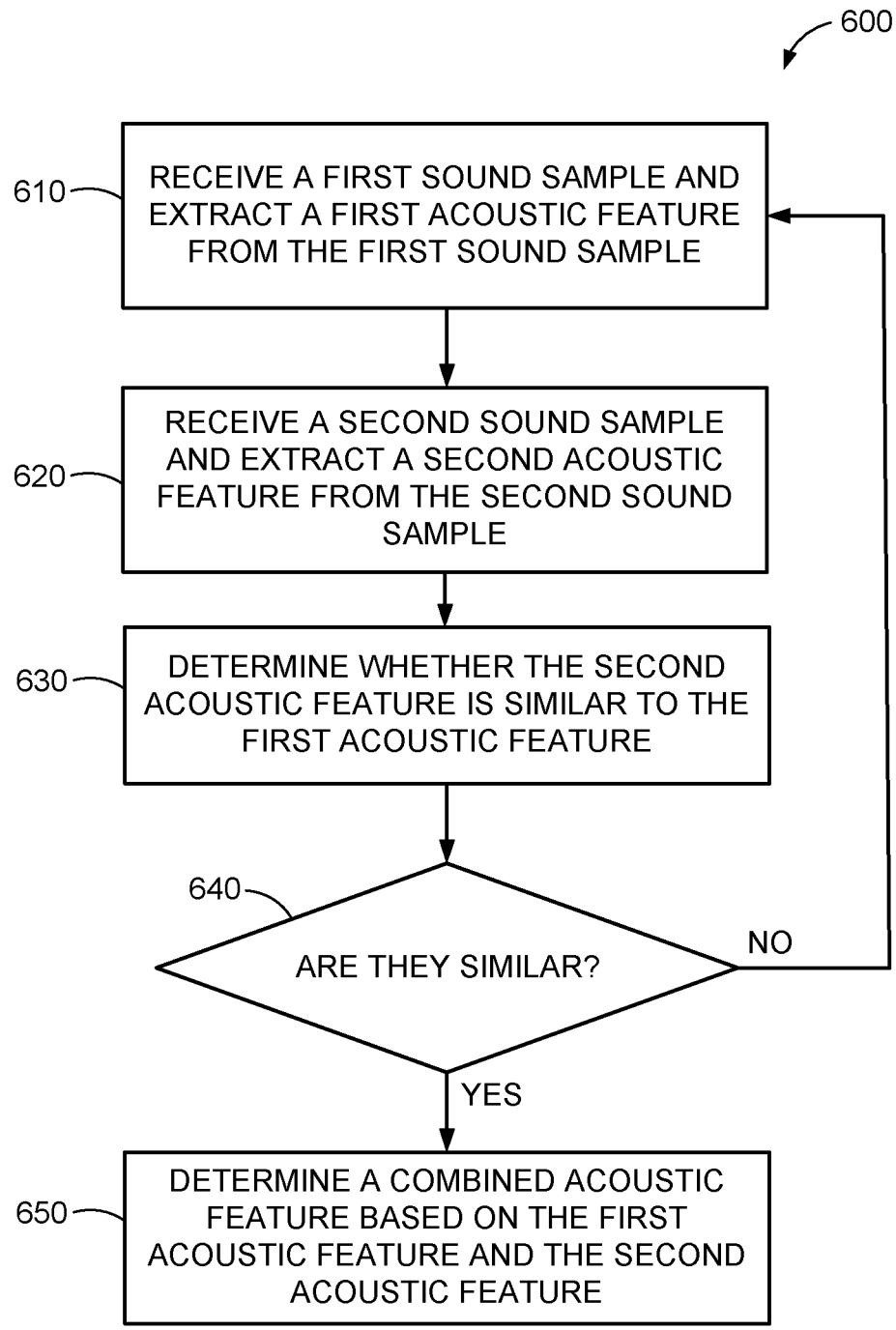
FIG. 6 is a flow chart of an exemplary method, performed in an electronic device, for determining a combined acoustic feature, according to one embodiment of the present disclosure.

FIG. 6 is a flow chart of a method 600, performed in the electronic device 100, for determining a combined acoustic feature, according to one embodiment of the present disclosure. Initially, the electronic device 100 may receive a first sound sample and extract a first acoustic feature from the first sound sample, at 610. The electronic device 100 may receive a second sound sample and extract a second acoustic feature from the second sound sample, at 620. The electronic device 100 may determine whether the second acoustic feature is similar to the first acoustic feature, at 630. If the first and second acoustic features are determined to be similar (i.e., YES at 640), the electronic device 100 may determine a combined acoustic feature based on the first and second acoustic features, at 650. If the first and second acoustic features are determined not to be similar (i.e., NO at 640), the method 600 may proceed to 610 for receiving the first sound sample and extract the first acoustic feature from the first sound sample.

Figure 7:
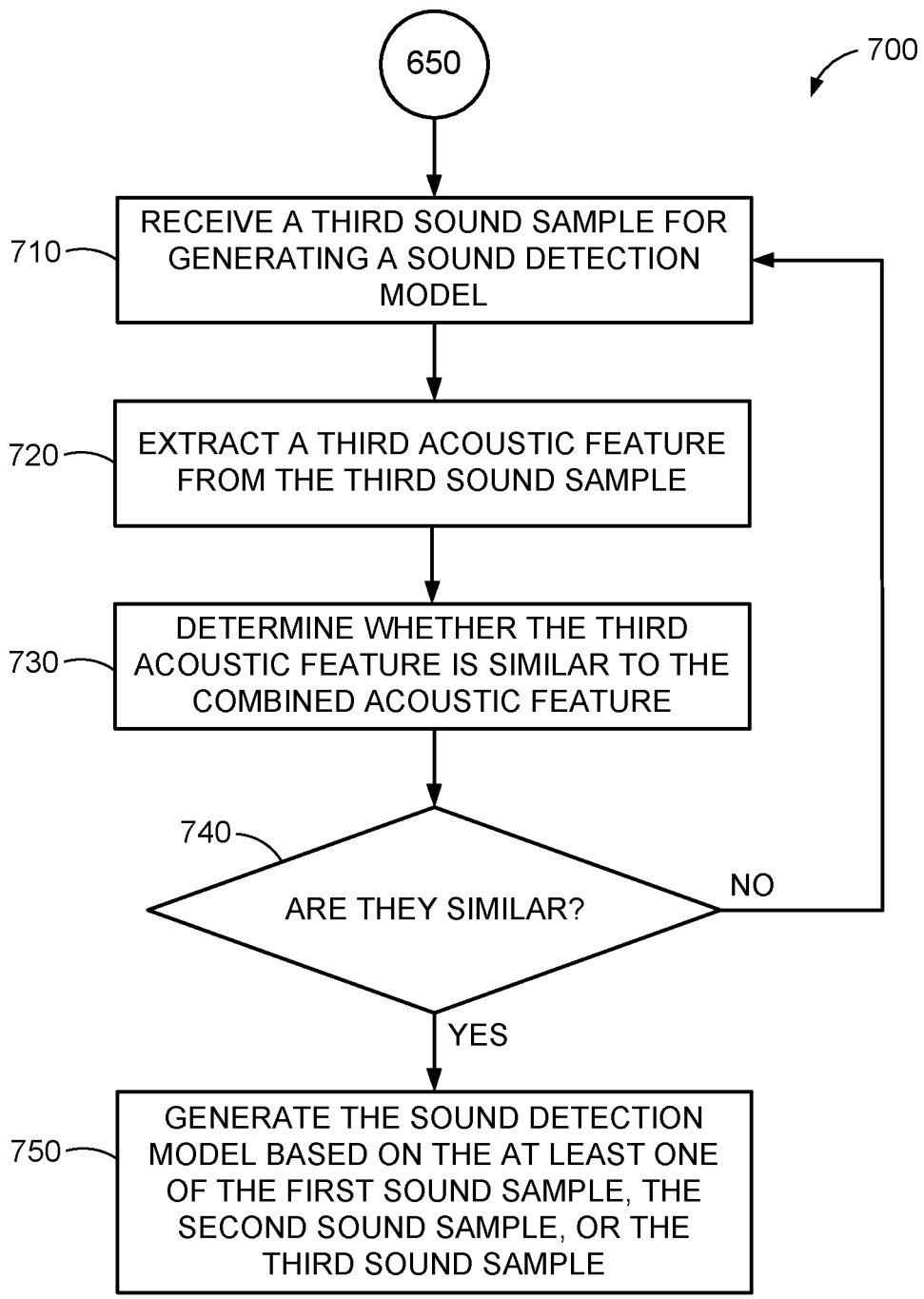
FIG. 7 is a flow chart of an exemplary method, performed in an electronic device, for verifying one or more sound samples to be used in generating a sound detection model, according to another embodiment of the present disclosure.

FIG. 7 is a flow chart of a method 700, performed in the electronic device 100, for verifying one or more sound samples to be used in generating a sound detection model, according to another embodiment of the present disclosure. As illustrated in FIG. 6, the electronic device 100 may determine the combined acoustic feature based on the first and second acoustic features. The electronic device 100 may receive a third sound sample for generating a sound detection model, at 710. The electronic device 100 may extract a third acoustic feature from the third sound sample, at 720. The electronic device 100 may determine whether the third acoustic feature is similar to the combined acoustic feature of the first and second acoustic features, at 730. If the third acoustic feature is determined to be similar to the combined acoustic feature (i.e., YES at 740), the electronic device 100 may generate the sound detection model based on the at least one of the first sound sample, the second sound sample, or the third sound sample, at 750. If the third acoustic feature is determined not to be similar to the combined acoustic feature (i.e., NO at 740), the method 700 may proceed to 710 for receiving a third sound sample.

Figure 8:
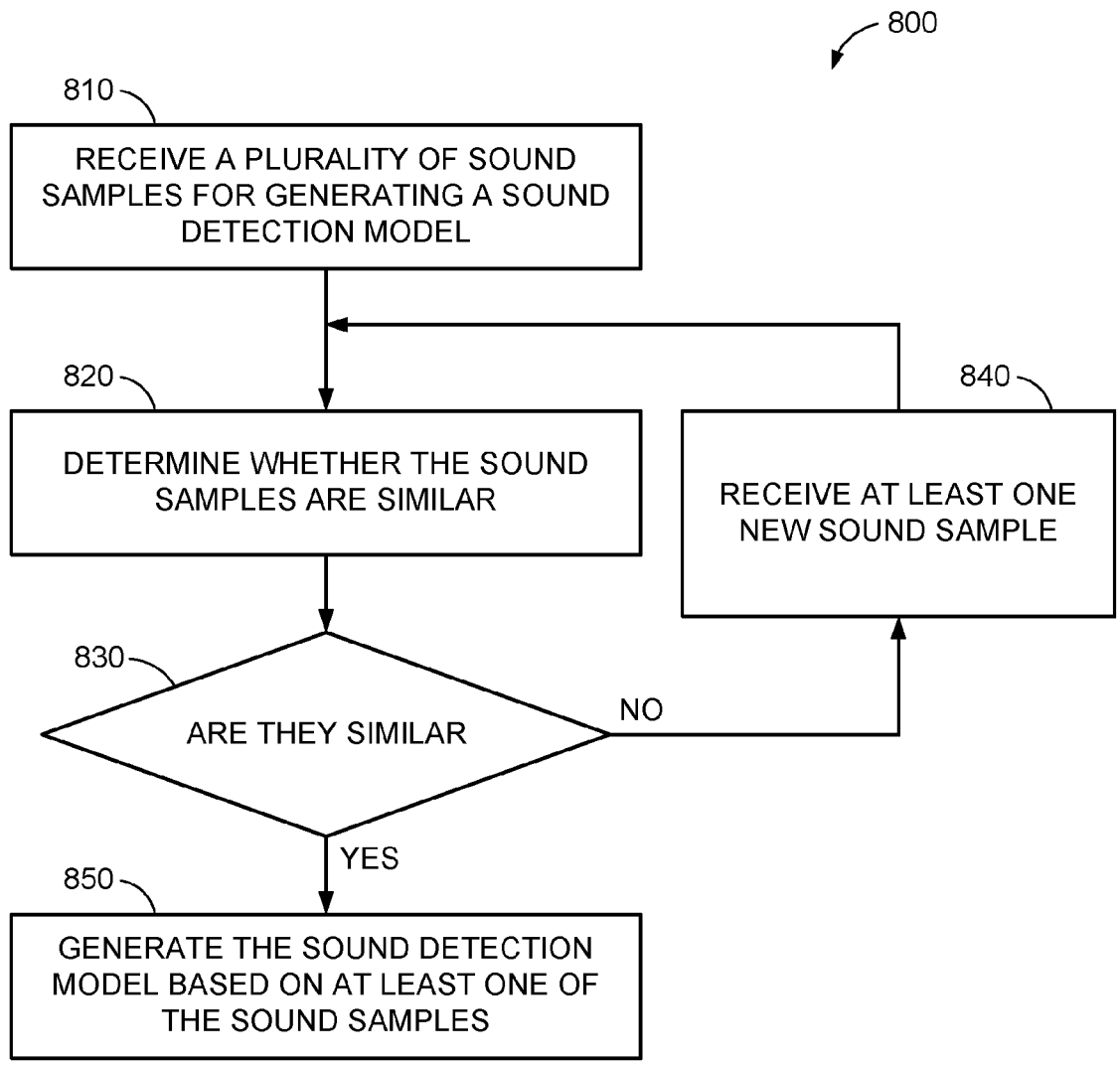
FIG. 8 is a flow chart of an exemplary method, performed in an electronic device, for verifying one or more sound samples to be used in generating a sound detection model in a batch mode, according to one embodiment of the present disclosure.

FIG. 8 is a flow chart of a method 800, performed in the electronic device 100, for verifying one or more sound samples to be used in generating a sound detection model in a batch mode, according to one embodiment of the present disclosure. The electronic device 100 may receive a plurality of sound samples for generating a sound detection model, at 810. The electronic device 100 may determine whether the received sound samples are similar, at 820. If the sound samples are determined to be similar (i.e., YES at 830), the electronic device 100 may generate the sound detection model based on the at least one of the sound samples, at 850. If the sound samples are determined not to be similar (i.e., NO at 830), the electronic device 100 may receive at least one new sound sample as a replacement sound sample for at least one sound sample that has been determined not to be similar to other sound samples, at 840, and the method 800 may proceed to 820 for determining whether the received sound samples are similar.

Figure 9:
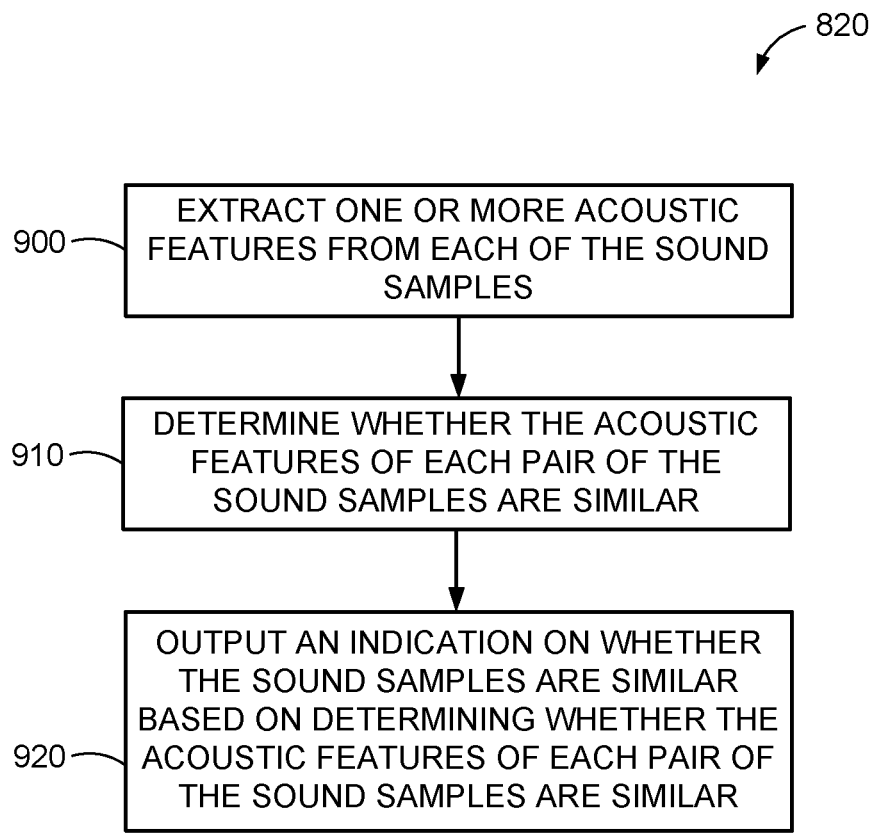
FIG. 9 is a flow chart of an exemplary method, performed in an electronic device, for determining whether acoustic features of one or more sound samples are similar, according to one embodiment of the present disclosure.

FIG. 9 is a flow chart of the method 820, performed in the electronic device 100, for determining whether acoustic features of one or more sound samples are similar, according to one embodiment of the present disclosure. The electronic device 100 may extract one or more acoustic features from each of the sound samples, at 900. The electronic device 100 may determine whether the acoustic features of each pair of the sound samples are similar, at 910. The electronic device 100 may output an indication on whether the sound samples are similar based on determining whether the acoustic features of each pair of the sound samples are similar, at 920.

Figure 10:
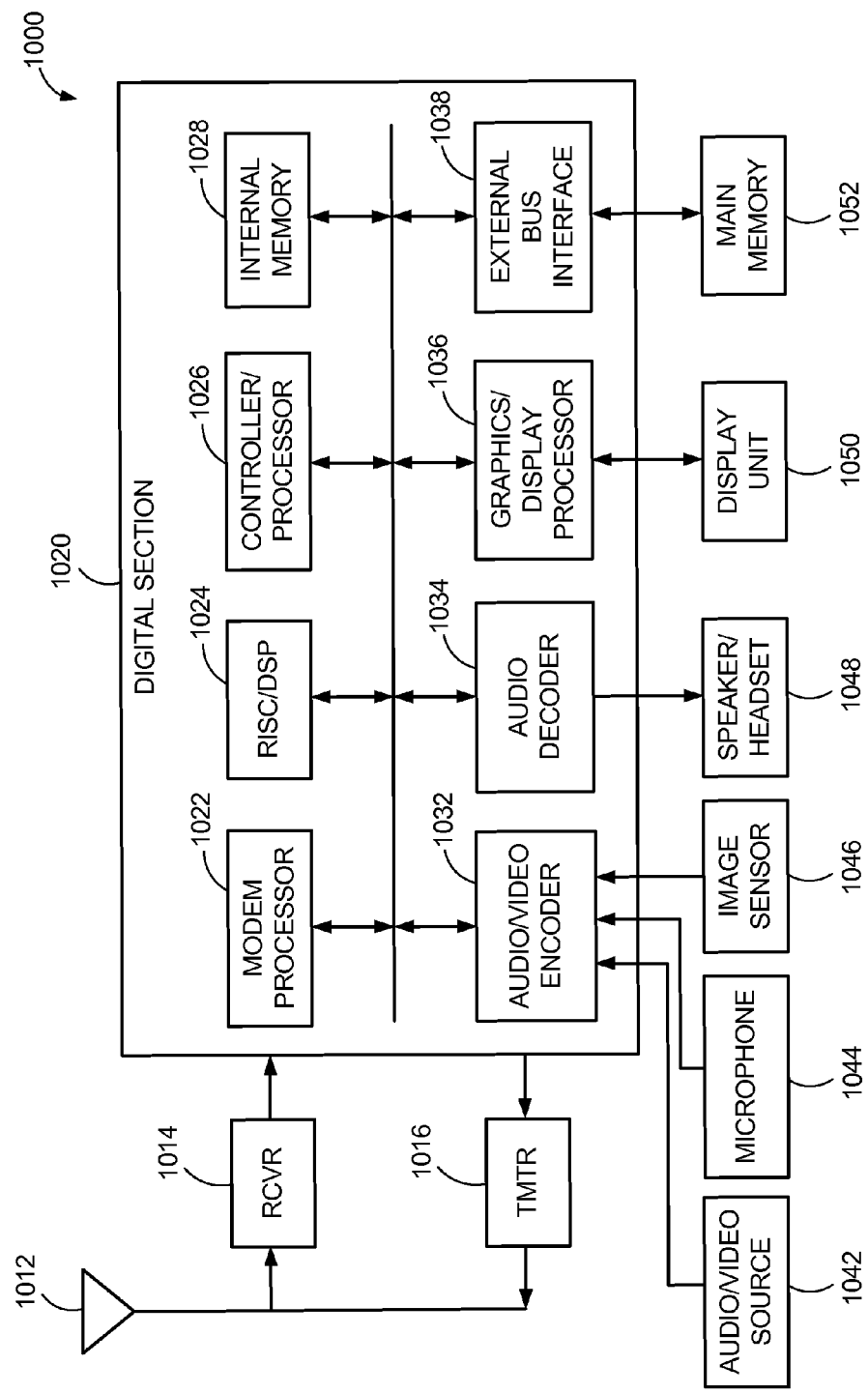
FIG. 10 illustrates a block diagram of an electronic device in which the methods and apparatus for verifying one or more sound samples to be used in generating a sound detection model may be implemented, according to some embodiments of the present disclosure.

FIG. 10 illustrates a block diagram of an exemplary electronic device 1000 in a wireless communication system in which the methods and apparatus of the present disclosure for verifying one or more sound samples to be used in generating a sound detection model may be implemented according to some embodiments. The exemplary electronic device 1000 may be a cellular phone, a smartphone, a wearable computer, a smart watch, smart glasses, a tablet personal computer, a terminal, a handset, a personal digital assistant (PDA), a wireless modem, a cordless phone, a tablet, and so on. The wireless communication system may be a CDMA system, a GSM system, a W-CDMA system, a LTE system, a LTE Advanced system, and so on.

The exemplary electronic device 1000 may be capable of providing bidirectional communication via a receive path and a transmit path. On the receive path, signals transmitted by base stations may be received by an antenna 1012 and may be provided to a receiver (RCVR) 1014. The receiver 1014 may condition and digitize the received signal, and provide the conditioned and digitized digital signal to a digital section for further processing. On the transmit path, a transmitter (TMTR) 1016 may receive data to be transmitted from a digital section 1020, process and condition the data, and generate a modulated signal, which is transmitted via the antenna 1012 to the base stations. The receiver 1014 and the transmitter 1016 may be part of a transceiver that may support CDMA, GSM, W-CDMA, LTE, LTE Advanced, and so on.

The digital section 1020 may include various processing, interface, and memory units such as, for example, a modem processor 1022, a reduced instruction set computer/digital signal processor (RISC/DSP) 1024, a controller/processor 1026, an internal memory 1028, a generalized audio/video encoder 1032, a generalized audio decoder 1034, a graphics/display processor 1036, and an external bus interface (EBI) 1038. The modem processor 1022 may perform processing for data transmission and reception, e.g., encoding, modulation, demodulation, and decoding. The RISC/DSP 1024 may perform general and specialized processing for the exemplary electronic device 1000. The controller/processor 1026 may perform the operation of various processing and interface units within the digital section 1020. The internal memory 1028 may store data and/or instructions for various units within the digital section 1020.

The generalized audio/video encoder 1032 may perform encoding for input signals from an audio/video source 1042, a microphone 1044, an image sensor 1046, etc. The generalized audio decoder 1034 may perform decoding for coded audio data and may provide output signals to a speaker/headset 1048. The graphics/display processor 1036 may perform processing for graphics, videos, images, and texts, which may be presented to a display unit 1050. The EBI 1038 may facilitate transfer of data between the digital section 1020 and a main memory 1052.

The digital section 1020 may be implemented with one or more processors, DSPs, microprocessors, RISCs, etc. The digital section 1020 may also be fabricated on one or more application specific integrated circuits (ASICs) and/or some other type of integrated circuits (ICs).

Figure 11:
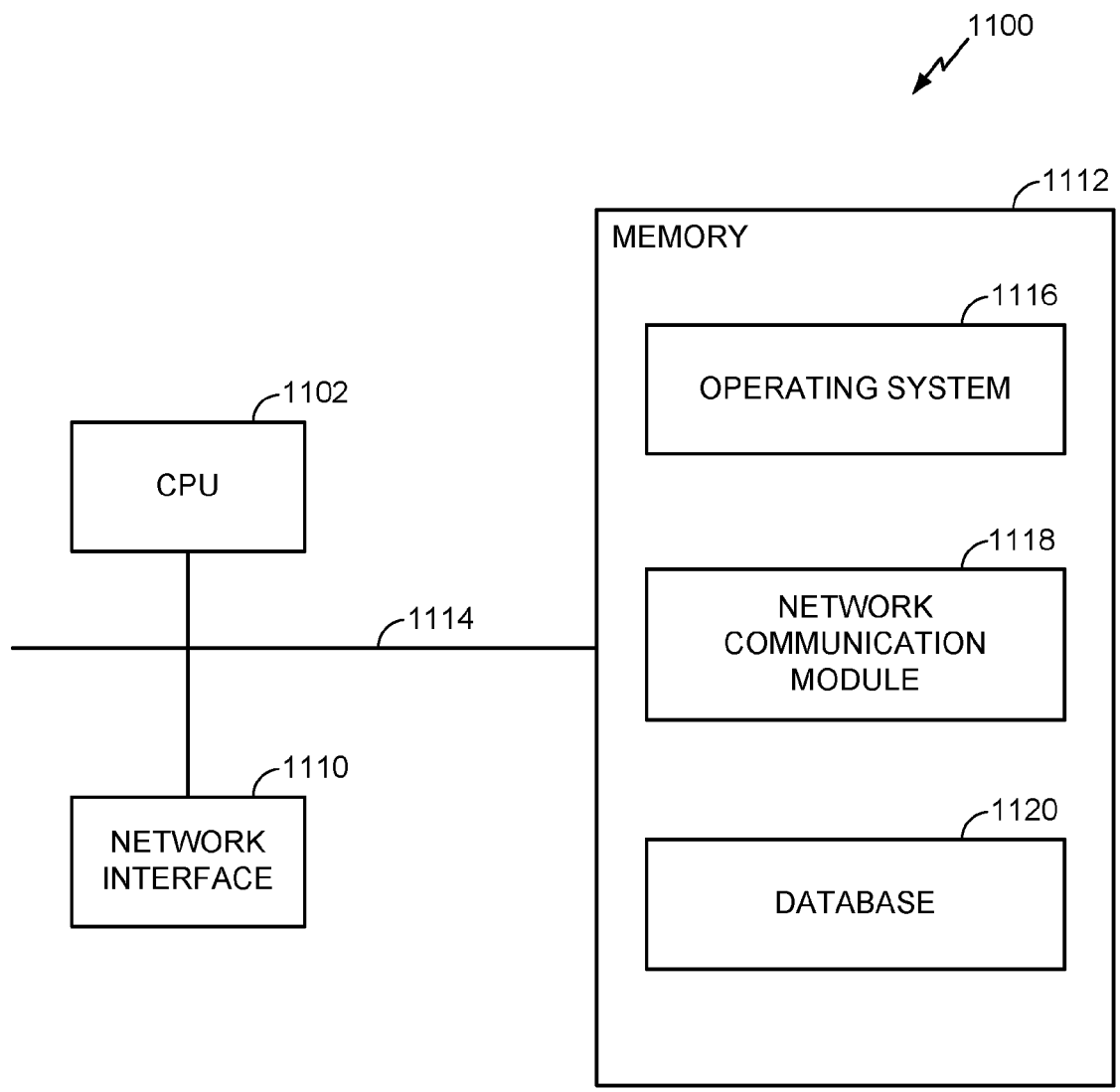
FIG. 11 illustrates a block diagram illustrating a server system, which may be any one of the servers previously described implemented according to some embodiments.

FIG. 11 is a block diagram illustrating a server system 1100, which may be any one of the servers previously described implemented according to some embodiments. The server system 1100 may include one or more processing units (e.g., CPUs) 1102, one or more network or other communications network interfaces, a memory 1112, and one or more communication buses 1114 for interconnecting these components. The server system 1100 may also include a user interface (not shown) having a display device and a keyboard.

The memory 1112 may be any suitable memory, such as a high-speed random access memory, (e.g., DRAM, SRAM, DDR RAM or other random access solid state memory devices). The memory 1112 may include or may alternatively be non-volatile memory (e.g., one or more magnetic disk storage devices, optical disk storage devices, flash memory devices, or other non-volatile solid state storage devices). In some embodiments, the memory 1112 may include one or more storage devices remotely located from the CPU(s) 1102 and/or remotely located in multiple sites.

Any one of the above memory devices represented by the memory 1112 may store any number of modules or programs that corresponds to a set of instructions for performing and/or executing any of the processes, operations, and methods previously described. For example, the memory 1112 may include an operating system 1116 configured to store instructions that includes procedures for handling various basic system services and for performing hardware dependent tasks. A network communication module 1118 of the memory 1112 may be used for connecting the server system 1100 to other computers via the one or more communication network interfaces 1110 (wired or wireless) and one or more communication networks, such as the Internet, other wide area networks, local area networks, metropolitan area networks, and so on.

The memory 1112 may also include a database 1120 configured to include an image database a plurality of images having one or more objects (e.g., a text object and a non-text object), a classifier database, a character information database, dictionary database, etc. The operating system 1116 may update the image database with various images, which may be received and/or captured, through the network communication module 1118. The operating system 1116 may also provide the images to a plurality of electronic devices via the network communication module 1118. In addition, the classifier database, the character information database, the dictionary database may be provided to a plurality of electronic device for use in detecting at least one text region of an image and/or recognize one or more character strings in the at least one text region.

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored at a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. For example, a computer-readable storage medium may be a non-transitory computer-readable storage device that includes instructions that are executable by a processor. Thus, a computer-readable storage medium may not be a signal.

The previous description of the disclosure is provided to enable a person skilled in the art to make or use the disclosure. Various modifications to the disclosure will be readily apparent to those skilled in the art, and the generic principles defined herein are applied to other variations without departing from the scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1112 may store additional modules and data structures not described above.

ASPECTS OF THE PRESENT DISCLOSURE

Hereinafter, some aspects of the present disclosure will be additionally stated.

Example 1

According to an aspect of the present disclosure, there is provided a method for verifying at least one sound sample to be used in generating a sound detection model, the method comprising: receiving a first sound sample; extracting a first acoustic feature from the first sound sample; receiving a second sound sample; extracting a second acoustic feature from the second sound sample; and determining whether the second acoustic feature is similar to the first acoustic feature.

Example 2

The method of Example 1 further comprises generating the sound detection model based on at least one of the first sound sample or the second sound sample, in response to determining that the second acoustic feature is similar to the first acoustic feature.

Example 3

The method of Example 1 or 2 further comprises determining a signal-to-noise ratio (SNR) of the first sound sample; determining an SNR of the second sound sample; selecting at least one of the first sound sample or the second sound sample based on the SNRs of the first and second sound samples; generating the sound detection model based on the selected at least one sound sample upon determining that the second acoustic feature is similar to the first acoustic feature; and adjusting the generated sound detection model based on the unselected sound sample.

Example 4

The method of any one of Examples 1 to 3 further comprises determining a combined acoustic feature based on the first acoustic feature and the second acoustic feature, in response to determining that the second acoustic feature is similar to the first acoustic feature.

Example 5

The method of any one of Examples 1 to 4 further comprises receiving a third sound sample; extracting a third acoustic feature from the third sound sample; and determining whether the third acoustic feature is similar to the combined acoustic feature.

Example 6

In the method of any one of Examples 1 to 5, each of the first acoustic feature and the second acoustic feature includes at least one of spectral features or time domain features.

Example 7

In the method of any one of Examples 1 to 6, each of the first acoustic feature and the second acoustic feature includes a sequence of subwords.

Example 8

In the method of any one of Examples 1 to 7, the subwords include at least one of phones, phonemes, triphones, or syllables.

Example 9

The method of any one of Examples 1 to 8 further comprises receiving a new sound sample in response to determining that the second acoustic feature is not similar to the first acoustic feature; extracting a new acoustic feature from the new sound sample; and determining whether the new acoustic feature is similar to the first acoustic feature.

Example 10

The method of any one of Examples 1 to 9 further comprises generating the sound detection model based on at least one of the first sound sample or the new sound sample in response to determining that the new acoustic feature is similar to the first acoustic feature.

Example 11

In the method of any one of Examples 1 to 10, generating the sound detection model comprises determining a threshold value of the sound detection model based on at least one of the first sound sample or the new sound sample; and adjusting the threshold value based on the second sound sample.

Example 12

The method of any one of Examples 1 to 11 further comprises outputting an indication on whether the second sound sample is similar to the first sound sample based on determining whether the second acoustic feature is similar to the first acoustic feature; and receiving an input indicative of at least one of the first sound sample or the second sound sample to be used in generating the sound detection model.

Example 13

In the method of any one of Examples 1 to 12, each of the first sound sample and the second sound sample is indicative of at least one of a command to activate the electronic device or a command to control an application or a function in the electronic device.

Example 14

The method of any one of Examples 1 to 13 further comprises receiving a speech input; and recognizing at least one of a keyword or a user from the speech input based on the sound detection model.

Example 15

According to another aspect of the present disclosure, there is provided an electronic device for verifying at least one sound sample to be used in generating a sound detection model, comprising: a sound sensor configured to receive a first sound sample and a second sound sample; and a sound sample verification unit configured to extract a first acoustic feature from the first sound sample, extract a second acoustic feature from the second sound sample, and determine whether the second acoustic feature is similar to the first acoustic feature.

Example 16

The electronic device of Example 15 further comprises a sound detection model generation unit configured to generate the sound detection model based on at least one of the first sound sample or the second sound sample, in response to determining that the second acoustic feature is similar to the first acoustic feature.

Example 17

In the electronic device of Example 15 or 16, the sound sample verification unit is configured to determine a combined acoustic feature based on the first acoustic feature and the second acoustic feature, in response to determining that the second acoustic feature is similar to the first acoustic feature.

Example 18

In the electronic device of any one of Examples 15 to 17, the sound sensor is configured to receive a third sound sample; and the sound sample verification unit is configured to extract a third acoustic feature from the third sound sample and determine whether the third acoustic feature is similar to the combined acoustic feature.

Example 19

In the electronic device of any one of Examples 15 to 18, the sound sensor is configured to receive a new sound sample in response to determining that the second acoustic feature is not similar to the first acoustic feature, and the sound sample verification unit is configured to extract a new acoustic feature from the new sound sample and determine whether the new acoustic feature is similar to the first acoustic feature.

Example 20

According to still another aspect of the present disclosure, there is provided a non-transitory computer-readable storage medium comprising instructions causing at least one processor of an electronic device to perform operations of: receiving a first sound sample; extracting a first acoustic feature from the first sound sample; receiving a second sound sample; extracting a second acoustic feature from the second sound sample; and determining whether the second acoustic feature is similar to the first acoustic feature.

Example 21

The non-transitory computer-readable storage medium of Example 20 further comprises instructions causing the at least one processor of the electronic device to perform operations of generating the sound detection model based on at least one of the first sound sample or the second sound sample, in response to determining that the second acoustic feature is similar to the first acoustic feature.

Example 22

The non-transitory computer-readable storage medium of Example 20 or 21 further comprises instructions causing the at least one processor of the electronic device to perform operations of determining a combined acoustic feature based on the first acoustic feature and the second acoustic feature, in response to determining that the second acoustic feature is similar to the first acoustic feature.

Example 23

The non-transitory computer-readable storage medium of any one of Examples 20 to 22 further comprises instructions causing the at least one processor of the electronic device to perform operations of: receiving a third sound sample; extracting a third acoustic feature from the third sound sample; and determining whether the third acoustic feature is similar to the combined acoustic feature.

Example 24

The non-transitory computer-readable storage medium of any one of Examples 20 to 23 further comprises instructions causing the at least one processor of the electronic device to perform operations of: receiving a new sound sample in response to determining that the second acoustic feature is not similar to the first acoustic feature; extracting a new acoustic feature from the new sound sample; and determining whether the new acoustic feature is similar to the first acoustic feature.

Example 25

According to yet another aspect of the present disclosure, there is provided an electronic device for verifying at least one sound sample to be used in generating a sound detection model, comprising: means for receiving a first sound sample; means for extracting a first acoustic feature from the first sound sample; means for receiving a second sound sample; means for extracting a second acoustic feature from the second sound sample; and means for determining whether the second acoustic feature is similar to the first acoustic feature.

Example 26

The electronic device of Example 25 further comprises means for generating the sound detection model based on at least one of the first sound sample or the second sound sample, in response to determining that the second acoustic feature is similar to the first acoustic feature.

Example 27

The electronic device of Example 25 or 26 further comprises means for determining a combined acoustic feature based on the first acoustic feature and the second acoustic feature, in response to determining that the second acoustic feature is similar to the first acoustic feature.

Example 28

The electronic device of any one of Examples 25 to 27 further comprises: means for receiving a third sound sample; means for extracting a third acoustic feature from the third sound sample; and means for determining whether the third acoustic feature is similar to the combined acoustic feature.

Example 29

The electronic device of any one of Examples 25 to 28 further comprises: means for receiving a new sound sample in response to determining that the second acoustic feature is not similar to the first acoustic feature; means for extracting a new acoustic feature from the new sound sample; and means for determining whether the new acoustic feature is similar to the first acoustic feature.

Example 30

The electronic device of any one of Examples 25 to 29 further comprises: means for outputting an indication on whether the second sound sample is similar to the first sound sample based on determining whether the second acoustic feature is similar to the first acoustic feature; and means for receiving an input indicative of at least one of the first sound sample or the second sound sample to be used in generating the sound detection model.

What is claimed:
1. A method performed in an electronic device, the method comprising:
    receiving a first sound sample;
    extracting a first acoustic feature from the first sound sample;
    receiving a second sound sample;
    extracting a second acoustic feature from the second sound sample;
    determining whether the second acoustic feature is similar to the first acoustic feature; and
    in response to determining that the second acoustic feature is not similar to the first acoustic feature, outputting a determination result indicating whether the second sound sample is to be used in generating a sound detection model, the determination result including a request for a replacement sound sample.

2. The method of claim 1, wherein the determination result indicates to a user that the second sound sample will not be used in generating the sound detection model.

3. The method of claim 1, further comprising:
   determining a first signal-to-noise ratio of the first sound sample;
   determining a second signal-to-noise ratio of the second sound sample; and
   generating the sound detection model based on at least one of the first signal-to-noise ratio or the second signal-to-noise ratio.

4. The method of claim 1, further comprising:
   receiving a third sound sample;
   extracting a third acoustic feature from the third sound sample;
   based on determining that the third acoustic feature is similar to the first acoustic feature, determining a combined acoustic feature based on the first acoustic feature and the third acoustic feature;
   receiving a fourth sound sample;
   extracting a fourth acoustic feature from the fourth sound sample; and
   determining whether the fourth acoustic feature is similar to the combined acoustic feature.

5. The method of claim 1, wherein each of the first acoustic feature and the second acoustic feature includes at least one of spectral features or time domain features, and wherein the electronic device comprises a mobile communication device.

6. The method of claim 1, wherein each of the first acoustic feature and the second acoustic feature includes a sequence of subwords, and wherein the subwords include at least one of phones, phonemes, triphones, or syllables.

7. The method of claim 1, further comprising generating the sound detection model at a device that comprises a multimedia device.

8. The method of claim 1, further comprising:
   receiving an additional sound sample in response to determining that the second acoustic feature is not similar to the first acoustic feature;
   extracting a particular acoustic feature from the additional sound sample; and
   determining whether the particular acoustic feature is similar to the first acoustic feature.

9. The method of claim 8, further comprising generating the sound detection model based on at least one of the first sound sample and the additional sound sample in response to determining that the particular acoustic feature is similar to the first acoustic feature.

10. The method of claim 9, wherein generating the sound detection model comprises:
    determining a threshold value of the sound detection model based on at least one of the first sound sample or the additional sound sample; and
    adjusting the threshold value based on the second sound sample.

11. The method of claim 8, further comprising:
    displaying an indication that the additional sound sample is similar to the first sound sample in response to determining that the particular acoustic feature is similar to the first acoustic feature.

12. The method of claim 1, wherein each of the first sound sample and the second sound sample is indicative of at least one of a command to activate the electronic device or a command to control an application or a function in the electronic device.

13. The method of claim 9, further comprising:
    receiving input data associated with a speech input; and
    recognizing, from the input data, at least one of a keyword or a user based on the sound detection model.

14. An electronic device comprising:
    a sound sensor configured to generate a plurality of sound samples including a first sound sample and a second sound sample;
    a sound sample verification unit configured to extract a first acoustic feature from the first sound sample and to extract a second acoustic feature from the second sound sample; and
    an output unit configured to output a determination result in response to a determination by the sound sample verification unit that the second acoustic feature is not similar to the first acoustic feature, the determination result indicating whether the second sound sample is to be used in generating a sound detection model, the determination result including a request for a replacement sound sample.

15. The electronic device of claim 14, further comprising:
    a sound detection model generation unit configured to generate the sound detection model based on at least one of the plurality of sound samples in response to a determination by the sound sample verification unit that acoustic features of two or more of the plurality of sound samples are similar to one another; and
    an input unit configured to receive an input indicative of at least one of the plurality of sound samples,
    wherein the sound sample verification unit is further configured to:
      determine a combined acoustic feature based on the two or more of the plurality of sound samples in response to a determination by the sound sample verification unit that the acoustic features of the two or more of the plurality of sound samples are similar to one another;
      extract another acoustic feature from another sound sample received by the sound sensor; and
      determine whether the other acoustic feature is similar to the combined acoustic feature.

16. A non-transitory computer-readable storage medium comprising instructions causing at least one processor of an electronic device to perform operations of:
    receiving a first sound sample;
    extracting a first acoustic feature from the first sound sample;
    receiving a second sound sample;
    extracting a second acoustic feature from the second sound sample; and
    determining whether the second acoustic feature is similar to the first acoustic feature; and
    in response to determining that the second acoustic feature is not similar to the first acoustic feature;
      outputting a determination result indicating whether the second sound sample is to be used in generating a sound detection model;
      receiving an additional sound sample in response to determining that the second acoustic feature is not similar to the first acoustic feature;
      extracting a particular acoustic feature from the additional sound sample;
      determining whether the particular acoustic feature is similar to the first acoustic feature; and
      displaying an indication that the additional sound sample is similar to the first sound sample in response to determining that the particular acoustic feature is similar to the first acoustic feature.

17. The non-transitory computer-readable storage medium of claim 16, wherein the sound detection model is generated without the second acoustic feature based on determining that the second acoustic feature is not similar to the first acoustic feature.

18. The non-transitory computer-readable storage medium of claim 16, wherein the operations further comprise:
receiving a third sound sample;
extracting a third acoustic feature from the third sound sample; and
determining a combined acoustic feature based on the first acoustic feature and the third acoustic feature in response to determining that the third acoustic feature is similar to the first acoustic feature.

19. The non-transitory computer-readable storage medium of claim 18, wherein the operations further comprise:
receiving a fourth sound sample;
extracting a fourth acoustic feature from the fourth sound sample; and
determining whether the fourth acoustic feature is similar to the combined acoustic feature.

20. An electronic device for verifying at least one sound sample to be used in generating a sound detection model, comprising:
means for receiving sound samples, the means for receiving configured to receive a first sound sample and a second sound sample;
means for extracting acoustic features, the means for extracting configured to extract a first acoustic feature from the first sound sample and to extract a second acoustic feature from the second sound sample;
means for determining whether the second acoustic feature is similar to the first acoustic feature; and
means for outputting a determination result in response to a determination by the means for determining that the second acoustic feature is not similar to the first acoustic feature, the determination result indicating whether the second sound sample is to be used in generating the sound detection model, the determination result including a request for a replacement sound sample.

21. The electronic device of claim 20,
means for receiving an additional sound sample in response to the determination by the means for determining that the second acoustic feature is not similar to the first acoustic feature;
means for extracting a particular acoustic feature from the additional sound sample; and
means for determining whether the particular acoustic feature is similar to the first acoustic feature.

22. The electronic device of claim 20, wherein the means for determining is configured to determine a combined acoustic feature based on the first acoustic feature and another acoustic feature in response to a determination that the other acoustic feature is similar to the first acoustic feature, wherein the means for receiving is configured to receive a third sound sample, wherein the means for extracting is configured to extract a third acoustic feature from the third sound sample, and wherein the means for determining is configured to determine whether the third acoustic feature is similar to the combined acoustic feature.

23. The electronic device of claim 14, further comprising:
an antenna;
a receiver coupled to the antenna and configured to receive an encoded audio signal; and
a demodulator coupled to the receiver, the demodulator configured to demodulate the encoded audio signal.

24. The electronic device of claim 23, further comprising:
a processor coupled to the demodulator; and
a decoder coupled to the processor, the decoder configured to decode the encoded audio signal,
wherein the receiver, the demodulator, the processor, the decoder, the sound sensor, the sound sample verification unit, and the output unit are integrated into a mobile communication device.

25. The electronic device of claim 14, wherein the sound sensor, the sound sample verification unit, and the output unit are integrated into a multimedia device.

26. The electronic device of claim 20, wherein the means for receiving the sound samples, the means for extracting the acoustic features, and the means for outputting are integrated into a mobile communication device.

27. The electronic device of claim 20, wherein the means for receiving the sound samples, the means for extracting the acoustic features, and the means for outputting are integrated into a multimedia device.

28. The method of claim 8, further comprising, based on a determination that the particular acoustic feature is similar to the first acoustic feature, generating the sound detection model based on a fourth acoustic feature of the first sound sample and a fifth acoustic feature of the additional sound sample, wherein the fourth acoustic feature is a different type of acoustic feature than the first acoustic feature, and the fifth acoustic feature is a different type of acoustic feature than the particular acoustic feature.

* * * * *